(12) United States Patent
Yao et al.

(10) Patent No.: US 12,093,813 B2
(45) Date of Patent: Sep. 17, 2024

(54) DYNAMIC NEURAL NETWORK SURGERY

(71) Applicant: Intel Corporation, Santa Clara, CA (US)

(72) Inventors: Anbang Yao, Beijing (CN); Yiwen Guo, Beijing (CN); Yan Li, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1056 days.

(21) Appl. No.: 16/328,689

(22) PCT Filed: Sep. 30, 2016

(86) PCT No.: PCT/CN2016/101043
§ 371 (c)(1),
(2) Date: Feb. 26, 2019

(87) PCT Pub. No.: WO2018/058509
PCT Pub. Date: Apr. 5, 2018

(65) Prior Publication Data
US 2019/0188567 A1 Jun. 20, 2019

(51) Int. Cl.
*G06N 3/08* (2023.01)
*G06N 3/04* (2023.01)
*G06N 3/082* (2023.01)
*G06N 3/045* (2023.01)

(52) U.S. Cl.
CPC ............. *G06N 3/08* (2013.01); *G06N 3/04* (2013.01); *G06N 3/082* (2013.01); *G06N 3/045* (2023.01)

(58) Field of Classification Search
CPC ............ G06N 3/08; G06N 3/04; G06N 3/082; G06N 3/045
See application file for complete search history.

(56) References Cited

U.S. PATENT DOCUMENTS

| 5,636,326 | A  | * | 6/1997 | Stork | G01N 33/005 706/25 |
| 10,229,356 | B1 | * | 3/2019 | Liu | G10L 15/16 |
| 10,515,312 | B1 | * | 12/2019 | Kubo | G06N 3/04 |

(Continued)

FOREIGN PATENT DOCUMENTS

| CN | 105137967 | 12/2015 |
| WO | 2018000309 | 1/2018 |
| WO | 2018053835 | 3/2018 |

OTHER PUBLICATIONS

Han, Song, Huizi Mao, and William J. Dally. "Deep compression: Compressing deep neural networks with pruning, trained quantization and huffman coding." arXiv preprint arXiv:1510.00149 (2015). (Year: 2015).*

(Continued)

*Primary Examiner* — Omar F Fernandez Rivas
*Assistant Examiner* — Tri T Nguyen
(74) *Attorney, Agent, or Firm* — Akona IP PC

(57) ABSTRACT

Techniques related to compressing a pre-trained dense deep neural network to a sparsely connected deep neural network for efficient implementation are discussed. Such techniques may include iteratively pruning and splicing available connections between adjacent layers of the deep neural network and updating weights corresponding to both currently disconnected and currently connected connections between the adjacent layers.

25 Claims, 7 Drawing Sheets

(56) References Cited

U.S. PATENT DOCUMENTS

| | | | |
|---|---|---|---|
| 2013/0138436 A1 | 5/2013 | Yu et al. | |
| 2013/0138589 A1 | 5/2013 | Yu et al. | |
| 2014/0067735 A1 | 3/2014 | Yu et al. | |
| 2018/0046895 A1* | 2/2018 | Xie | G06N 3/063 |
| 2018/0046903 A1* | 2/2018 | Yao | G06N 3/048 |

OTHER PUBLICATIONS

Shamir, Nachum, David Saad, and Emanuel Marom. "Neural net pruning based on functional behavior of neurons." International Journal of Neural Systems 4.02 (1993): 143-158. (Year: 1993).*

Shafiee, Mohammad Javad, Parthipan Siva, and Alexander Wong. "Stochasticnet: Forming deep neural networks via stochastic connectivity." IEEE Access 4 (2016): 1915-1924. (Year: 2016).*

Ardakani, Arash, Carlo Condo, and Warren J. Gross. "Sparsely-connected neural networks: towards efficient vlsi implementation of deep neural networks.v1" arXiv preprint arXiv:1611.01427 (2016). (Year: 2016).*

Zhao, Hang, et al. "Loss functions for neural networks for image processing." arXiv preprint arXiv:1511.08861 (2015). (Year: 2015).*

Krizhevsky, Alex, Ilya Sutskever, and Geoffrey E. Hinton. "Imagenet classification with deep convolutional neural networks." Advances in neural information processing systems 25 (2012): 1097-1105. (Year: 2012).*

Koo, Terry, et al. "Structured prediction models via the matrix-tree theorem." Joint Conference on Empirical Methods in Natural Language Processing and Computational Natural Language Learning (EMNLP-CONLL). 2007. (Year: 2007).*

"Why Pretraining for Convolutional Neural Networks" https://stackoverflow.com/questions/26423668/why-pretraining-for-convolutional-neural-networks (2014) (Year: 2014).*

"Why Are Activation Functions Needed In Neural Networks?" https://stats.stackexchange.com/questions/158549/why-are-activation-functions-needed-in-neural-networks (2015) (Year: 2015).*

Tran et al., Learning both Weights and Connections for Efficient Neural Networks, Oct. 2015, 9 pages (Year: 2015).*

International Preliminary Report on Patentability for PCT Application No. PCT/CN2016/101043, mailed Apr. 11, 2019.

International Search Report & Written Opinion for International Patent Application No. PCT/CN16/101043, mailed Jul. 3, 2017.

Chen, et al., "Compressing Convolutional Neural Networks", arXiv:1506.04449v1 [cs.LG] (2015): 1-9.

Cheng, et al., "An Exploration of Parameter Redundancy in Deep Networks with Circulant Projections", IEEE International Conference on Computer Vision (ICCV) (2015): 9 pages.

Courbariaux, et al., "BinaryConnect: Training Deep Neural Networks with Binary Weights During Propagations", Advances in Neural Information Processing Systems (NIPS) (2015): 1-9.

Gong, et al., "Compressing Deep Convolutional Networks using Vector Quantization", International Conference on Learning Representations (ICLR) (2015): 1-10.

Graves, et al., "Speech Recognition with Deep Recurrent Neural Networks", IEEE International Conference on Acoustic, Speech and Signal Processing (ICASSP) (2013): 6645-6649.

Han, et al., "Deep Compression: Compressing Deep Neural Networks with Pruning, Trained Quantization and Huffman Coding", International Conference on Learning Representations (ICLR) (2015):1-13.

Han, et al., "EIE: Efficient Inference Engine on Compressed Deep Neural Network", International Symp on Computer Architecture (ISCA) (2016): 12 pages.

Han, et al., "Learning both Weights and Connections for Efficient Neural Networks", Advances in Neural Information Processing Systems (NIPS) (2015): 1-9.

Iandola, et al., "SqueezeNet: AlexNet-level accuracy with 50x fewer parameters and <1MB model size", arXiv.org > cs > arXiv:1602.07360; (2016): 1-5.

Jaderberg, et al., "Speeding up Convolutional Neural Networks with Low Rank Expansions", British Machine Vision Conference (BMVC) (2014): 1-13.

Krizhevsky, A. et al., "ImageNet Classification with Deep Convolutional Neural Networks", In Advances in Neural Information Processing systems (NIPS) (2012):1-9.

Li, et al., "Ternary Weight Networks", arXiv.org > cs > arXiv:1605.04711 (2016): 1-9.

Mathieu, et al., "Fast Training of Convolutional Networks through FFTs", arXiv:1312.5851v5 [cs.CV] (2014): 1-9.

Rastegari, et al., "XNOR-Net: ImageNet Classification Using Binary Convolutional Neural Networks", arXiv.org > cs > arXiv:1603.05279 (2016): 1-17.

Yang, et al., "Deep Fried Convnets", IEEE International Conference on Computer Vision (ICCV) (2015): 9 pages.

Zhang, et al., "Accelerating Very Deep Convolutional Networks for Classification and Detection", IEEE Trans. Pattern Analysis and Machine Intelligence (2015): 1-14.

* cited by examiner

DYNAMIC NEURAL NETWORK SURGERY

CLAIM OF PRIORITY

This Application is a National Stage Entry of, and claims priority to, PCT Application No. PCT/CN16/101043, filed on 30 Sep. 2016 and titled "DYNAMIC NEURAL NETWORK SURGERY", which is incorporated by reference in its entirety for all purposes.

BACKGROUND

Deep neural networks (DNNs) are useful in a variety of artificial intelligence fields such as computer vision using deep convolutional neural networks (CNNs) and speech recognition using deep recurrent neural networks (RNNs). However, known DNN architectures may include many stacked layers and learnable parameters, resulting in heavy implementation costs in terms of computation and memory. As a result, it may not be possible to deploy such DNNs on current or emerging devices such as mobile devices.

Current techniques for DNN model compression and/or implementation speed up include lossy and lossless approaches. Lossy techniques include truncated singular vector decomposition (SVD), vector quantization (VQ), and hashing to remove parameter redundancy in the layers of well-trained DNN models as well as graphics processing unit (GPU) implementation, Fast Fourier Transforms (FFTs), circulant projections (CPs), and low rank expansions (LREs) that attempt to speed up the feed-forward testing of well-trained DNN models. One drawback of such lossy techniques is that they suffer from accuracy loss to some extent, especially for recent binary and ternary methods with model accuracy dropping significantly when handling deep and dense neural networks. Lossless techniques include reducing well-trained dense DNN models into lossless sparse models by deleting unimportant parameters and retraining the remaining ones. Such techniques may reduce storage requirements and may be used in designing hardware accelerators for implementation. However, such lossless techniques may have difficulties such as irretrievably losing connections during training and learning inefficiency as several (e.g., at least 4) iterations of alternating pruning and retraining (including hundreds of thousands of training iterations) are required.

It may be advantageous to compress DNNs for efficient implementation on ever more mobile devices while maintaining high accuracy. It is with respect to these and other considerations that the present improvements have been needed. Such improvements may become critical as the desire to perform artificial intelligence in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
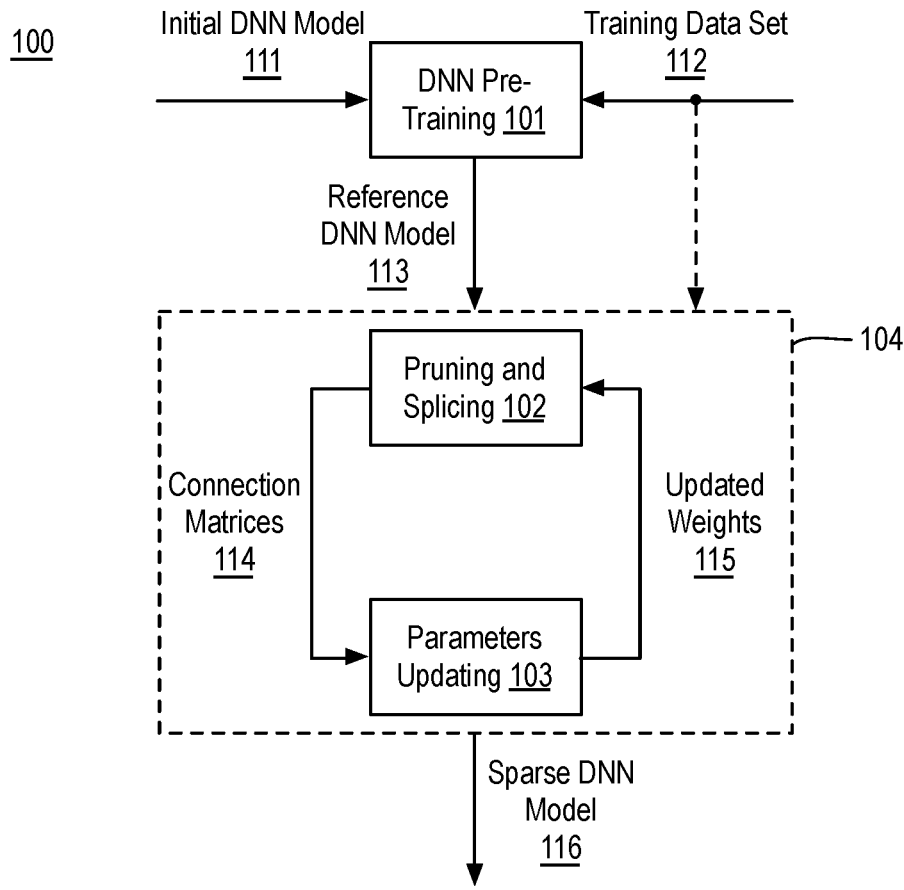
FIG. 1 illustrates an example device for compressing a trained deep neural network.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, systems, computing platforms, and articles are described herein related to compressing deep neural networks by pruning and splicing a trained deep neural network to generate a sparse neural network for artificial intelligence implementations.

As described above, deep neural networks (DNNs) may include many layers and many parameters that place a heavy burden on devices during implementation. As is discussed herein, a trained (e.g., pre-trained) deep neural network model having full connectivity, convolutional layers, fully connected layers, or the like between available connections and weights or parameters for each of such connections, convolutional layers, fully connected layers, or the like may be received for compression. For example, such DNNs may be characterized as dense DNNs. The compression discussed herein may include iterative pruning and splicing operations and parameter weight update operations. Such pruning operations (e.g., disconnecting an available connection at a particular iteration) may compress the DNN model by removing unimportant connections and such splicing operations (e.g., reconnecting previously disconnected available connections at a particular iteration) may provide recovery for pruned connections that are found to be important over the iterations. Such techniques provide dynamic network surgery for learning lossless highly sparse DNNs. Such techniques may be performed on the fly to compress a pre-trained (i.e., fully trained) DNN model.

The reference DNN received for compression may be any suitable DNN such as a deep fully connected neural network, a deep convolutional neural network, a deep recurrent neural network, or the like. The compressed or sparse DNN may be implemented for classifying input data to generate classification data in the context of, for example, computer vision, visual recognition, face recognition, face detection, object detection, gesture recognition, voice detection, voice identification, speech recognition, or the like. As discussed, the DNN model compression techniques discussed herein may include pruning and splicing operations. In some embodiments the pruning and splicing operations are integrated into a Stochastic Gradient Descent (SGD) variant by updating parameter importance whenever necessary. The discussed techniques may provide sparse DNNs with ~18-100× compression rates or more without accuracy loss allowing implementation, due to the decreased memory, computation, and energy requirements, on a wider range of devices such as mobile devices and the like.

In some embodiments discussed herein, a sparsely connected deep neural network model may be generated based on a fully trained deep neural network model having an input layer, a plurality of hidden layers, an output layer, and available connections between the layers by, iteratively, pruning and splicing available connections between at least two adjacent layers of the deep neural network model such that pruning includes disconnecting connections of the available connections and said splicing includes reconnecting connections of the available connections (e.g., reconnecting connections that were disconnected in a previous iteration) and updating weights corresponding to both the currently disconnected and the currently connected connections of the available connections between the two adjacent layers. Such iterative pruning and splicing may be performed any number of times such as ~700,000 times (e.g., on AlexNet including 8 layers and 60 million parameters) or the like to provide connections at a final iteration and corresponding weights. The sparsely connected deep neural network model having final iteration weights for only connected connections of the available connections may be stored in memory for implementation and/or transmitted to another device for implementation.

FIG. 1 illustrates an example device 100 for compressing a pre-trained deep neural network, arranged in accordance with at least some implementations of the present disclosure. As shown in FIG. 1, device 100 may include a deep neural network (DNN) pre-training module 101, a pruning and splicing module 102, and parameters updating module 103. As shown, pruning and splicing module 102 and parameters updating module 103 may be implemented as a compression module 104 or the like. As shown, in some embodiments, device 100 may implement both DNN pre-training module 101 and compression module 104. For example, DNN pre-training module 101 and compression module 104 may be characterized as a sparse DNN model pipeline. In an embodiment, device 100 may implement only compression module 104 and a reference DNN model 113 may be received from another device. Device 100 may be any suitable form factor device such as a personal computer, a laptop computer, a tablet, a phablet, a smart phone, a digital camera, a gaming console, a smart TV, a wearable device, a display device, an all-in-one device, a two-in-one device, an in-vehicle infotainment device, a web server, or the like.

As shown, DNN pre-training module 101 may receive an initial DNN model 111 and a training data set 112 and DNN pre-training module 101 may generate reference DNN model 113 by training initial DNN model 111 using training data set 112. Initial DNN model 111 may be any suitable deep neural network such as a deep fully connected neural network, a deep convolutional neural network, a deep recurrent neural network, or the like. In some embodiments, initial DNN model 111 may have layers that provide inner products on vector spaces for compressing using the techniques discussed herein.

DNN pre-training module 101 may generate reference DNN model 113 using any suitable technique or techniques. For example, training data set 112 may include training data for object recognition training (e.g., images having pre-labeled objects), training data for speech recognition training (e.g., voice recordings of known utterances), and so on. Through iterative training using training data set 112, initial DNN model 111 may be trained to generate reference DNN model 113. For example, initial DNN model 111 may have a predetermined number of layers each having a predetermined number of nodes. For example, initial DNN model 111 may have an input layer, a number of hidden layers, and an output layer each with any suitable number of nodes. The weights or parameters of initial DNN model 111 may then be determined based on training data set 112 to generate reference DNN model 113. Reference DNN model 113 may include any suitable data structure representing a deep neural network. For example, reference DNN model 113 may include weights for a fully connected deep neural network (e.g., a weight for each available connection of the DNN), weights for coefficients of each kernel of a convolutional neural network, or the like. For example, reference DNN model 113 may include on the order of 60,000,000 weights or parameters.

Also as shown, compression module 104 receives reference DNN model 113 and at least a portion of training data set 112 and compression module 104 generates a sparse DNN model 116 using techniques discussed further herein. Sparse DNN model 116 may include any suitable data structure representative of a sparse DNN model. For example, sparse DNN model 116 may include weights for only those connections that are not pruned by compression module 104. All other weights may be set to zero (e.g., all other available connections may not be used) such that compression of reference DNN model 113 is provided.

Figure 2:
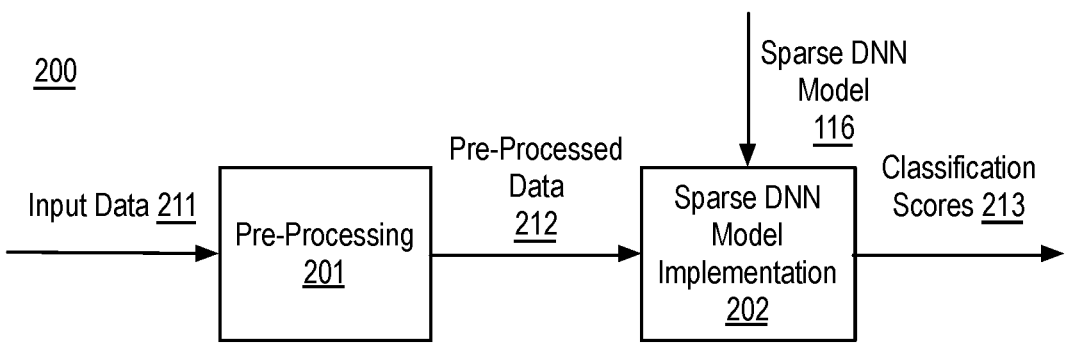
FIG. 2 illustrates an example device for implementing a sparse neural network model.

FIG. 2 illustrates an example device 200 for implementing a sparse neural network model, arranged in accordance with at least some implementations of the present disclosure. As shown in FIG. 2, device 200 may include a pre-processing module 201 and a sparse DNN model implementation module 202 that may receive sparse DNN model 116 (e.g., from volatile or non-volatile memory, not shown) and implement sparse DNN model 116. As shown, in some embodiments, device 200 may implement only pre-processing module 201 and sparse DNN model implementation module 202 such that sparse DNN model 116 may be received from another device. For example, pre-processing module 201 and sparse DNN model implementation module 202 may be implemented as an artificial intelligence processing application or pipeline. In an embodiment, device 200 or device 100 may implement one or more of DNN pre-training module 101, compression module 104, pre-processing module 201, and sparse DNN model implementation module 202. As with device 100, device 200 may be any suitable form factor device such as a personal computer, a laptop computer, a tablet, a phablet, a smart phone, a digital camera, a gaming console, a smart TV, a wearable device, a display device, an all-in-one device, a two-in-one device, an in-vehicle infotainment device, a web server, or the like.

As shown, pre-processing module 201 may receive input data 211 and pre-processing module 201 may generate pre-processed data 212. Input data 211 may include any suitable data and pre-processing module 201 may generate pre-processed data 212 using any suitable technique or techniques such that pre-processed data 212 are suitable for processing by a deep neural network. For example, input data 211 may include image data (e.g., from an image sensor or image preprocessor), audio data (e.g., from a microphone or audio preprocessor), or the like. Pre-processing module 201 may pre-process input data 211 into a form of a pre-processed or normalized data suitable for processing by sparse DNN model 116. For example, pre-processing module 201 may provide image resizing, cropping, subtraction of pixel mans from a training dataset, or the like in the context of image processing or audio normalization or the like in the context of audio processing to generate pre-processed data 212.

Pre-processed data 212 may be received by sparse DNN model implementation module 202 and sparse DNN model implementation module 202 may implement sparse DNN model 116 to generate classification scores 213 or similar data representative of outputs from an output layer of sparse DNN model 116. For sparse DNN model 116 as implemented by sparse DNN model implementation module 202 may provide hierarchical feature extraction (e.g., via hidden layers) and classification (e.g., via an output layer) to generate classification scores 213. Classification scores 213 may include any suitable data or data structures classifying features, regions, temporal portions, or the like of pre-processed data 212 as provided by sparse DNN model implementation module 202. For example, classification scores 213 may be outputs from an output layer of sparse DNN model 116. In the context of speech recognition, classification scores 213 may include scores of sub-phonetic audio units for time slices of a speech recording represented by input data 211. Such classification scores may be used to recognize received speech into a recognized word sequence. In the context of facial recognition, classification scores 213 may represent likelihoods an image represented by input data 211 includes a face of multiple users, and so on. In an embodiment, classification scores 213 are used by another module or application to provide a variety of outputs for device 200.

For example, sparse DNN model implementation module 202 may implement sparse DNN model 116 as a part of an artificial intelligence processing application or pipeline or the like such that input data 211 is received for processing, pre-processed data 212 are optionally extracted from input data 211 (as needed, in some examples sparse DNN model implementation module 202 may be capable of processing input data 211), classification scores 213 are generated by sparse DNN model implementation module 202 based on pre-processed data, and classification scores 213 are used to generate data for use by device 200 and/or for presentation to a user of device 200.

For example, the artificial intelligence processing application receives input data for classification and classifies the input data to generate classification data. In an embodiment, the artificial intelligence processing application is a computer vision application, the input data is image or video data, and the classification data represents labeled images or video (e.g., images with regions labeled with background, car, person, animal, hand, face, etc.). In an embodiment, the artificial intelligence processing application is a face recognition application, the input data is image or video data, and the classification data represents labeled faces (e.g., images or video with regions labeled as faces and with such faces labeled with an identification of to whom the face belongs). In an embodiment, the artificial intelligence processing application is a face detection application, the input data is image or video data, and the classification data represents labeled faces (e.g., images or video with regions labeled as positive detection of faces). In an embodiment, the artificial intelligence processing application is an object detection application, the input data is image or video data, and the classification data represents labeled objects (e.g., images or video with regions or objects labeled as people, trees, buildings, chairs, etc.). In an embodiment, the artificial intelligence processing application is a gesture recognition application, the input data is image or video data, and the classification data represents labeled gestures (e.g., a hand waving, a head nodding, etc.). In an embodiment, the artificial intelligence processing application is a voice detection application, the input data is audio data, and the classification data represents an indicator that a human voice has been detected in the audio data. In an embodiment, the artificial intelligence processing application is a voice identification application, the input data is audio data, and the classification data represents an identification of the source of the audio data (e.g., a speaker from a number of available speakers or the like). In an embodiment, the artificial intelligence processing application is a speech to recognized series of textual elements application, the input data is audio data, and the classification data represents a series of identified words, utterances, or the like (e.g., a string of text or words corresponding to the received speech). Although several implementations are described herein, sparse DNN model 116 as implemented by sparse DNN model implementation module 202 may be used in any context to translate received input data to likelihood scores, classification scores, output values, neural network output values, or the like.

Figure 3:
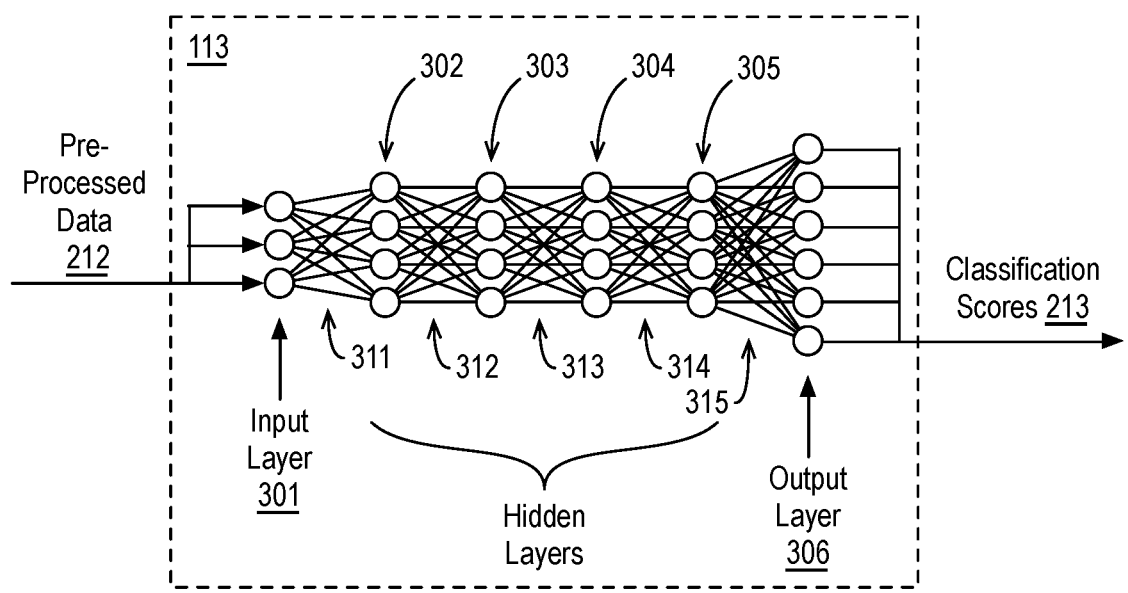
FIG. 3 illustrates an example reference DNN model.

Returning to FIG. 1, as discussed, DNN pre-training module 101 may generate reference DNN model 113. FIG. 3 illustrates an example reference DNN model 113, arranged in accordance with at least some implementations of the present disclosure. Reference DNN model 113 is shown in operation for the sake of clarity of presentation. As will be appreciated, reference DNN model 113 may be a pre-trained implementation of a DNN model or structure as provided by initial DNN model 111. As shown in FIG. 3, reference DNN model 113 may have an input layer 301 including any number of nodes (e.g., a number of input layer nodes equal to the number of inputs to reference DNN model 113 as provided by pre-processed data). Based on pre-processed data, reference DNN model 113 generates classification scores 213 such that an output layer 306 of reference DNN model 113 may include as many outputs as states or the like provided or the like as required by classification scores 213.

With continued reference to FIG. 3, reference DNN model 113 may include input layer 301, hidden layers 302-305, and an output layer 306. Reference DNN model 113 is illustrated as having three input nodes, hidden layers with four nodes each, and six output nodes for the sake of clarity of presentation. As discussed, input layer 301 may include any number of nodes. For example, input layer 301 may have 200 to 300 nodes, 300 to 400 nodes, or more nodes. Furthermore, as in the illustrated example, reference DNN model 113 may include four hidden layers 302-305. However, in other examples, reference DNN model 113 may include three, five, six, or more hidden layers. Hidden layers 302-305 may include any number of nodes. For example, hidden layers 302-305 may include 1,500 to 2,000 nodes, 2,000 to 2,500 nodes, or the like. In some examples, hidden layers 302-305 have the same number of nodes and in other examples, one or more layers may have different numbers of nodes. Output layer 306 may include any suitable number of nodes such that classification scores 213 include values for use in artificial intelligence applications as discussed herein. For example, output layer 306 may include hundreds of nodes, thousands of nodes, or more.

As shown, every node of reference DNN model 113 is fully connected to every node in the adjacent layers of reference DNN model 113 (e.g., the layers may be fully connected). For example, every node of input layer 301 is connected to every node of hidden layer 302 by connections 311, every layer of hidden layer 302 is connected to every node of hidden layer 303 by connections 312, every layer of hidden layer 303 is connected to every node of hidden layer 304 by connections 313, every layer of hidden layer 304 is connected to every node of hidden layer 305 by connections 314, and every layer of hidden layer 305 is connected to every node of output layer 306 by connections 315. As is discussed further herein, connections 311-315 may be characterized as available connections such that they are connections that are available within reference DNN model 113. Such available connections may be pruned and spliced to disconnect some of such available connections to generate sparse DNN model 116 leaving only a portion of connections 311-315 and with corresponding weights. Such compression advantageously reduces the memory, computation, and power required to implement sparse DNN model 116 as compared to reference DNN model 113. Although illustrated with respect to a fully connected DNN for the sake of clarity of presentation, the techniques discussed herein are also applicable to deep convolutional neural networks, deep recurrent neural networks, or the like. For example, reference DNN model 113 may be a deep fully connected neural network, a deep convolutional neural network, a deep recurrent neural network, or the like as discussed herein.

Returning again to FIG. 1, reference DNN model 113 and at least portions of training data set 112 (or another training data set) are received by compression module 104 for iterative processing by pruning and splicing module 102 and parameters updating module 103. For example, at each iteration, pruning and splicing module 102 prunes and splices available connections between adjacent layers of reference DNN model 113 such that pruning disconnects previously connected available connections and splicing reconnects previously disconnected available connections. As used herein, the term available connection refers to any connection between nodes of adjacent layers that may be made or any available weighting for a convolutional kernel or similar operator of a neural network layer. For example, an available connection may be currently disconnected (e.g., pruned) or currently connected (e.g., never pruned or currently spliced if previously pruned). At a current iteration of such pruning and slicing, pruning and splicing module 102 provides a set of connection matrices 114 (a connection matrix for each group of adjacent layers) that indicate, for each available connection, whether the available connection is currently connected or disconnected. Such connection matrices 114 may be characterized as a binary matrix, a binary connection matrix, a binary pruning matrix, or the like. Furthermore, although the discussion of compression module 104 is provided with respect to each group of adjacent layers being pruned and spliced, compression module 104 may be provided only for one or more groups of adjacent layers while other adjacent layers are left fully connected. For example, pruning and splicing may be performed on only some or a single layer of reference DNN model 113.

As shown, parameters updating module 103 receives connection matrices 114 and parameters updating module 103 updates weights for the available connections of reference DNN model 113 such that weights 115 are updated for both currently connected and currently disconnected available connections of reference DNN model 113. By updating weights 115 for both currently connected and currently disconnected available connections (as opposed to just currently connected available connections), those currently disconnected available connections that reveal themselves to be important in future iterations may be spliced. For example, parameters updating module 103 may update the weights based on a portion of training data set 112 such that the portion is evaluated by the current iteration of the DNN model and appropriate correction or reweighting or the like is provided based on the difference (e.g., network loss) between the result from the current iteration of the DNN model and the ground truth result based on the known training set.

Such pruning/splicing and weights or parameter updates implemented iteratively may sever redundant connections of reference DNN model 113 based on continual network maintenance (i.e., dynamic network surgery) including pruning operations to compress reference DNN model 113.

Furthermore, splicing operations may correct over-pruning or incorrect pruning across the iterations to reduce accuracy loss introduced by the pruning operations. Thus, the network surgery incorporates splicing to allow connection recovery after incorrectly pruned connections are found to become important. As is discussed further below, such pruning and splicing may be integrated into a Stochastic Gradient Descent (SGD) variant by updating parameter importance to provide for network surgery that is dynamic and flexible.

As discussed, reference DNN model 113 is received by compression module 104. In an embodiment, reference DNN model 113 is represented as $\{W_k: 0 \leq k \leq C\}$ such that $W_k$ provides a matrix of connection weights and biases (e.g., provided as a single entry) for the $k^{th}$ layer of reference DNN model 113, k is a counter, and C+1 is the number of connected layers. For the fully connected layers with p-dimensional inputs and q-dimensional outputs, the size of $W_k$ is $q_k \times p_k$. For a convolutional reference DNN model 113 with learnable kernels (e.g., a deep convolutional neural network), the weights may be coefficients of each kernel of the convolutional layer of adjacent layers. For example, the coefficients of each kernel may be unfolded into a vector and concatenated to $W_k$ as a matrix. For example, the matrices $W_k$ provide weights 115 as illustrated in FIG. 1.

To represent sparse DNN model 116 having some available connections disconnected (e.g., pruned), connection matrices may be provided as $\{W_k, T_k: 0 \leq k \leq C\}$ such that each $T_k$ is a binary matrix with its entries indicating the states of DNN connections (i.e., whether they are currently connected or disconnected). For example, matrices $T_k$ provide for connection matrices 114 as illustrated in FIG. 1. Such matrices may be characterized as the mask matrices or the like. For example, connection matrices 114 each include indicators that each indicates whether a corresponding available connection is connected or not connected. Such matrices may be implemented by a value of one indicating an available connection is connected and a value of zero indicating an available connection is not connected for example.

For a current iteration, pruning and splicing module 102 may generate connection matrices 114 based on weights 115 from a previous iteration (and from weights of reference DNN model 113 for a first iteration). For example, pruning and splicing module 102 may attempt to abandon unimportant parameters (e.g., disconnect available connections corresponding to such weights or parameters) and keep important parameters (e.g., leave connected or reconnect available connections corresponding to such weights or parameters). Therefore, a learning process is applied that, over multiple iterations, updates the network structure of the DNN model. For example, making the $k^{th}$ layer of reference DNN model 113 as an example, the optimization problem provided in Equation (1) may be solved:

$$\min_{W_k, T_k} L(W_k \odot T_k) \text{ s.t. } T_k^{(i,j)} = h_k(W_k^{(i,j)}), \forall (i,j) \in I \quad (1)$$

where $L(\cdot)$ is the network loss function, $\odot$ indicates the Hadamard product operator, set I includes all entries in matrix $W_k$, and $h_k(\cdot)$ is a discriminative function. In an embodiment, the discriminative function satisfies $h_k(w)=1$ if parameter w is deemed important at the current iteration for the current layer and $h_k(w)=0$ otherwise.

For example, previous iteration weights may be evaluated to determine whether they satisfy the discriminative function. If so, the corresponding connection may be maintained (if previously connected) or reconnected (if previously disconnected) and if not, the corresponding disconnection may be maintained (if previously disconnected) or disconnected (if previously connected). The discriminative function, in some embodiments, may also indicate a no change result such that the connection is left connected/disconnected without change. The discriminative function may be any suitable function. In an embodiment, discriminative function, $h_k(\cdot)$, may be designed such that it constrains a feasible region of $W_k \odot T_k$ and simplifies the original NP-hard problem for the DNN.

In an embodiment, the discriminative function evaluates an absolute value of the corresponding weight from a previous iteration. For example, available connections corresponding to parameters or weights with a relatively small magnitude are disconnected (or left disconnected) and available connections corresponding to parameters or weights with a relatively large magnitude are reconnected (or left connected). In an embodiment, applying the discriminative function comprises comparing an individual previous iteration connection weight to a threshold and providing a disconnect indicator when the individual previous iteration connection weight compares unfavorably to the threshold. Such an indicator may be implemented via connection matrices 114. The threshold of the discriminative function may be any suitable value or values. In an embodiment, the threshold is the same for all layers of the DNN. In an embodiment, different thresholds are used for different layers of the DNN.

Figure 4:
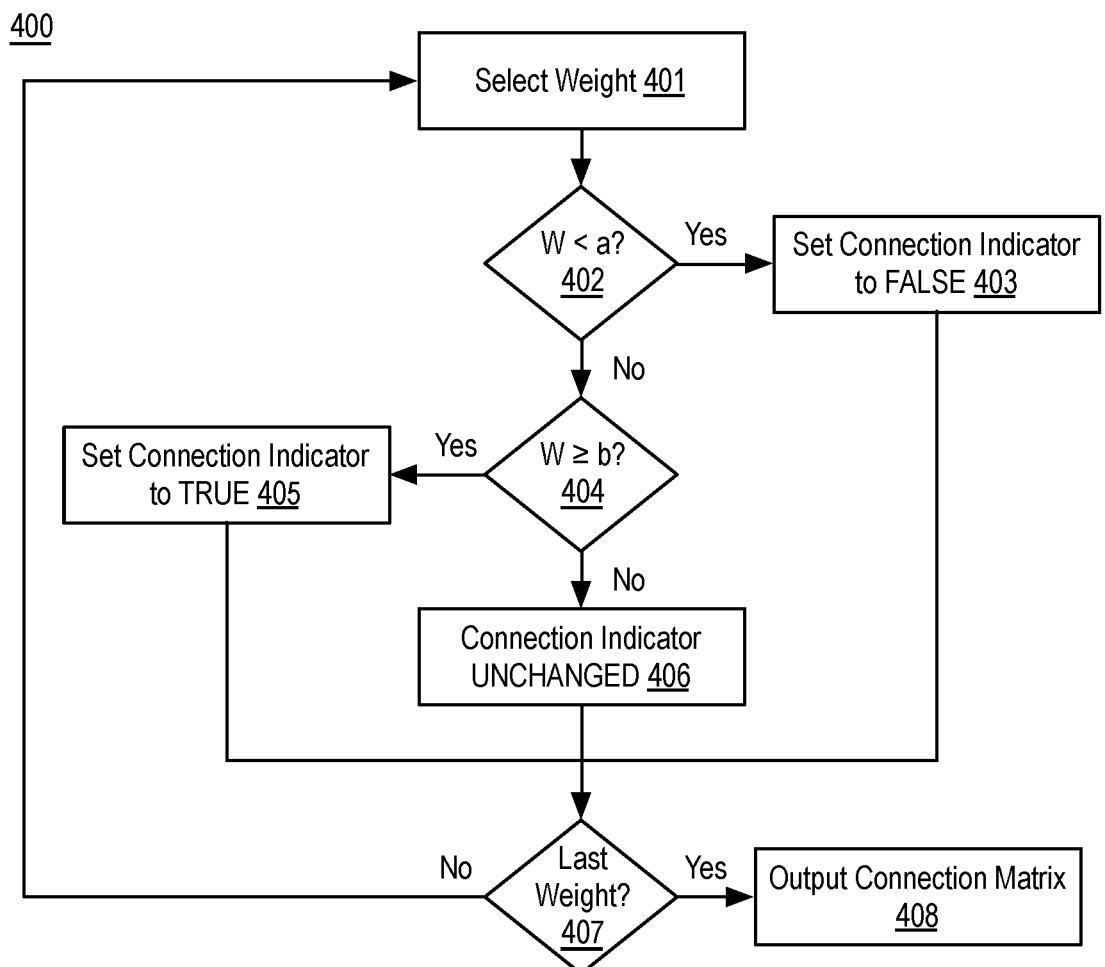
FIG. 4 illustrates an example process for implementing a discriminative function.

In other embodiments, multiple thresholds and a no change indicator may be implemented via the discriminative function. FIG. 4 illustrates an example process 400 for implementing a discriminative function, arranged in accordance with at least some implementations of the present disclosure. Process 400 may include one or more operations 401-408 as illustrated in FIG. 4. Process 400 may be performed by a device (e.g., device 100, any other devices or systems discussed herein, or an external training device such as a computer device or the like) to apply a discriminative function to weights to generate corresponding prune/splice/no change indicators.

As shown, process 400 may begin at operation 401 where a particular weight may be selected for evaluation. At decision operation 402, a determination may be made as to whether the weight compares unfavorably to a first threshold, a. The weight and the first threshold may be compared using any suitable technique or techniques. In an embodiment, an absolute value of the weight (e.g., the magnitude of the weight) is compared to the first threshold. If the weight compares unfavorably (e.g., the absolute value of the weight is less than the first threshold), processing may continue at operation 403, where a connection indicator for an available connection corresponding to the weight is set to false. For example, a connection indicator of false may provide for the corresponding entry of connection matrices 114 to indicate no connection or disconnect for the available connection. If the available connection was previously connected, it will be disconnected and, if the available connection was previously disconnected, it will remain disconnected.

If the weight compares favorably to the first threshold (e.g., the absolute value of the weight is greater than or equal to the first threshold), processing continues at decision operation 404, where a determination may be made as to whether the weight compares favorably to a second threshold, b, which is greater than the first threshold, a. The weight and the second threshold may be compared using any suitable technique or techniques. In an embodiment, an absolute value of the weight (e.g., the magnitude of the weight) is compared to second threshold. If the weight compares favorably to the second threshold (e.g., the absolute value of the weight is greater than or equal to the second threshold), processing may continue at operation 405, where a connection indicator for an available connection corresponding to the weight is set to true. For example, a connection indicator of true may provide for the corresponding entry of connection matrices 114 to indicate a connection or reconnect for the available connection. If the available connection was previously connected, it will remain connected and, if the available connection was previously disconnected, it will be reconnected (spliced).

If the weight compares unfavorably to the second threshold, b, processing continues at decision operation 406, where a connection indicator for an available connection corresponding to the weight is set to unchanged, no change, or neutral. For example, a connection indicator of unchanged may provide for the corresponding entry of connection matrices 114 to indicate the same connection status from a previous iteration. If the available connection was previously connected, it will remain connected and, if the available connection was previously disconnected, it will remain disconnected.

As shown, processing may continue from any of operations 403, 405, or 406 at decision operation 407, where a determination may be made as to whether the currently selected weight was the last weight to be processed. If not, processing may continue at operation 401 and as discussed above. If so, processing may continue at operation 408, where a connection matrix or matrices may be output.

As discussed, two thresholds, a and b, may be used to evaluate a selected weight. In an embodiment, the thresholds may be the same for each group of adjacent layers (e.g., for every layer) of the DNN. In another embodiment, the thresholds may be different for different groups of adjacent layers of the DNN. In an embodiment, the two thresholds may have the same difference between them for each group of adjacent layers of the DNN. For example, two thresholds, $a_k$ and $b_k$, may be used for the adjacent layers by providing a small margin t such that the first threshold $a_k$ is selected and the second threshold $b_k$ is set as $a_k+t$ for each group of adjacent layers. In an embodiment, difference between the first and second thresholds across layers are different. As discussed with respect to FIG. 4 the two thresholds may be used to set connect/disconnect/no change indicators for each weight. In an embodiment, the connect/disconnect/no change indicators for each weight are provided as shown in Equation (2):

$$h_k(W_k^{(i,j)}) = \begin{cases} 0 & \text{if} \quad a_k > |W_k^{(i,j)}| \\ T_k^{(i,j)} & \text{if} \quad a_k \leq |W_k^{(i,j)}| < b_k \\ 1 & \text{if} \quad b_k \leq |W_k^{(i,j)}| \end{cases} \quad (2)$$

where $W_k^{(i,j)}$ is a current weight and $h_k$ provides the discriminative function.

Returning to FIG. 1 and Equation (1), the problem of Equation (1) may be solved by alternatively updating (e.g., iteratively updating) connection matrices 114 (e.g., $T_k$) and weights 115 (e.g., $W_k$). In an embodiment, such updating may include or incorporate a Stochastic Gradient Descent (SGD) variant. For example, connection matrices 114 (e.g., $T_k$) may be determined with the constraints of Equation (1) based on an implemented discriminative function such as those described above with respect to a single threshold or two thresholds. Discussion now turns to updating weights 115 (e.g., $W_k$). Based on the method of Lagrange multipliers, Equation (1) is equivalent to the expression provided in Equation (3):

$$\min_{W_k} L(W_k \odot T_k) + \frac{\gamma}{2} \sum_{(i,j) \in I} \left\| h_k(W_k^{(i,j)}) - T_k^{(i,j)} \right\| \quad (3)$$

with a certain γ>0 and the fixed $T_k$ determined as discussed above.

Since the discriminative function, $h_k(\cdot)$, may be a Boolean-valued function, the gradient of the discriminative function with respect to $W_k$ is zero (if it exists). Therefore, an update operation for $W_k$ may be provided as shown in Equation (4):

$$W_k^{(i,j)} \leftarrow W_k^{(i,j)} - \beta \frac{\partial}{\partial (W_k^{(i,j)} T_k^{(i,j)})} L(W_k \odot T_k), \forall (i,j) \in I \quad (4)$$

where β indicates a positive learning weight. For example, weights at the current iteration may be provided as updates to weights from the previous iterations such that updates include a product of a learning rate and a partial differential of the network loss for the weight. The network loss may be determined by applying the current iteration of the neural network to a subset of training data. As discussed, weights or parameters are updated for not only connected weights or parameters but also for disconnected weights or parameters (e.g., those having zero entries in $T_k$). Such seemingly unimportant, at a current iteration, weights or parameters may become important over iterations and, if so, corresponding connections may be spliced or reconnected as discussed. In an embodiment, the partial derivatives of Equation (4) may be determined using the chain rule with a randomly chosen mini-batch of samples of training data set 112.

Once connection matrices 114 (e.g., $T_k$) and weights 115 (e.g., $W_k$) are updated for a current iteration, they may be applied to determine the network activations and a loss function gradient for the DNN model, which may be used to update weights at subsequent iterations. Such steps may be repeated any number of times such as about 700,000 times (e.g., on AlexNet including 8 layers and 60 million parameters) or the like to generate sparse DNN model 116. As shown in FIG. 1, such updating of connection matrices 114 (e.g., based on previous iteration weights) and weights 115 (e.g., based on previous iteration weights and a network loss determined by applying the current iteration neural network to training data) may be iteratively repeated (e.g., hundreds of thousands of times) to generate sparse DNN model 116 corresponding to the final connection matrices 114 and the final weights 115. Sparse DNN model 116 may be saved to memory and/or implemented in an artificial intelligence application or pipeline as discussed herein.

With continued reference to FIG. 1, compression module 104 may, for example, perform operations as shown with respect to Pseudocode A as follows.

---
Pseudocode A
---

Input:
X: training datum (with or without label),
$\{\hat{W}_k: 0 \le k \le C\}$: the reference model,
α: the base learning rate, and
f: learning policy
Output:
$\{W_k, T_k: 0 \le k \le C\}$: the updated parameter matrices and their binary masks,
Process:
Initialize $W_k \leftarrow \hat{W}_k$, $T_k \leftarrow 1$, $\forall 0 \le k \le C$, $\beta \leftarrow 1$ and iter $\leftarrow 0$
Repeat:
   Choose a mini-batch of network input from X
   Forward propagation and loss calculation with $(W_0 \odot T_0), \ldots, (W_C \odot T_C)$
   Backward propagation of the model output and generate ∇L
   for k = 0, ..., C do
      Update $T_k$ by function $h_k(\cdot)$ and current $W_k$ with probability of σ(iter)
      Update $W_k$ by Equation (4) and the current loss function gradient ∇L
   end for
   Update: iter ← iter + 1 and β ← f (α, iter)
Until iter reaches desired maximum
End

---

In some embodiments, the convergence toward sparse DNN model 116 may be boosted. For example, the pruning and splicing frequency may be reduced such that pruning and splicing module 102 does not perform pruning and splicing at each iteration since those operations change the structure of the DNN model. In an embodiment, a determination may be made, at a current iteration as to whether to apply pruning and splicing and pruning and splicing may only be made in response to a positive determination. For example, at a current iteration, a pruning and splicing activation indicator indicating whether pruning and splicing are to be applied for the current iteration may be stochastically determined. In an embodiment, stochastically determining the pruning and splicing indicator may include applying a probability function based on the iteration number of the current iterations. For example, the probability function may be a monotonically non-increasing probability function. As discussed, pruning and splicing of available connections is only applied when the pruning and splicing activation indicator indicates pruning and splicing are to be applied for the current iteration. For example, a update process for connection matrices 114 (e.g., $T_k$) may be triggered stochastically, with a probability of p=σ(iter) such that function σ(•) may be a monotonically non-increasing function that satisfies σ(0)=1. In an embodiment, after a prolonged decrease, the probability p may even be set to zero such that no pruning or splicing will be performed for any additional iterations.

In some embodiments, the DNN model may include both fully connected layers and convolutional layers. In such embodiments, convergence may be enhanced by pruning and splicing the convolutional layers and fully connected layers separately. In an embodiment, such pruning and splicing and parameters updating processing may be performed only for one or more convolutional layers while leaving fully connected layers untouched and then pruning and splicing and parameters updating processing may be performed only for one or more fully connected layers while leaving the (compressed) convolutional layers untouched. In an embodiment, such pruning and splicing and parameters updating processing may be performed only for one or more fully connected layers while leaving convolutional layers untouched and then pruning and splicing and parameters updating processing may be performed only for one or more convolutional layers while leaving the (compressed) fully connected layers untouched.

Figure 5:
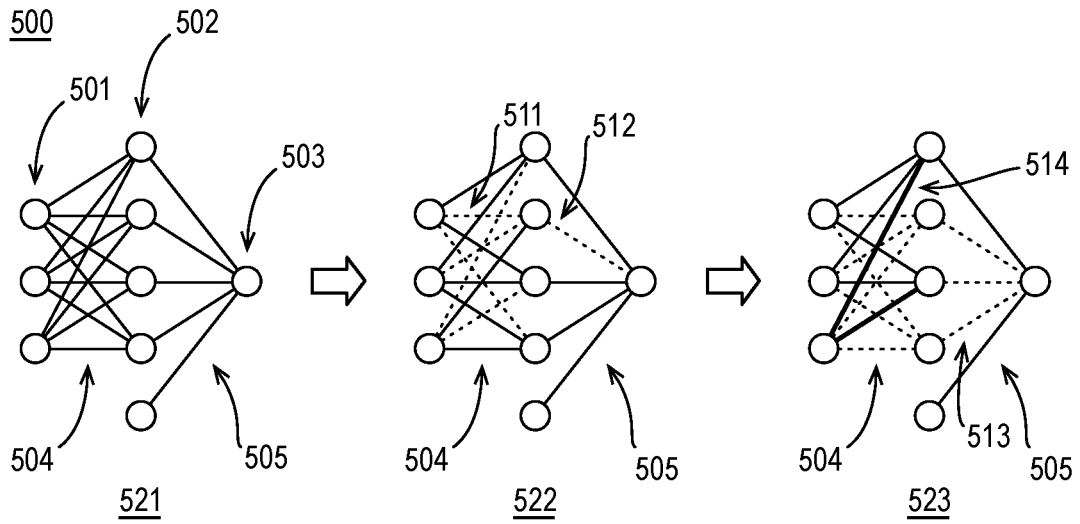
FIG. 5 illustrates example pruning and splicing across example iterations.

FIG. 5 illustrates example pruning and splicing 500 across example iterations 521, 522, 523, arranged in accordance with at least some implementations of the present disclosure. As shown in FIG. 5, at a first iteration 521, a portion of a DNN model including a first layer of nodes 501, a second layer of nodes 502, and a third layer including node 503 is fully connected with available connections 504 between first layer of nodes 501 and second layer of nodes 502 all being connected and with available connections 505 between second layer of nodes 502 and third layer node 503 also all being connected.

At a subsequent second iteration 522 some of available connections 504 and available connections 505 have been pruned or disconnected as discussed herein. Such pruned or disconnected available connections are illustrated with dotted lines and include disconnected connection 511 of available connections 504 and disconnected connection 512 of available connections 505. At a yet subsequent third iteration 523, some of available connections 504 and available connections 505 remain pruned or disconnected or have been newly pruned as discussed herein. Such pruned or disconnected available connections are illustrated with dotted lines and include newly disconnected connection 513 of available connections 505. Third iteration 523 also illustrates some of available connections 504 being spliced or reconnected as discussed herein. Such spliced or reconnected available connections are illustrated with heavy lines and include reconnected connection 514 of available connections 504.

As will be appreciated, at each iteration where pruning and splicing are performed, any number of available connections may be disconnected, reconnected, or left unchanged.

Figure 6:
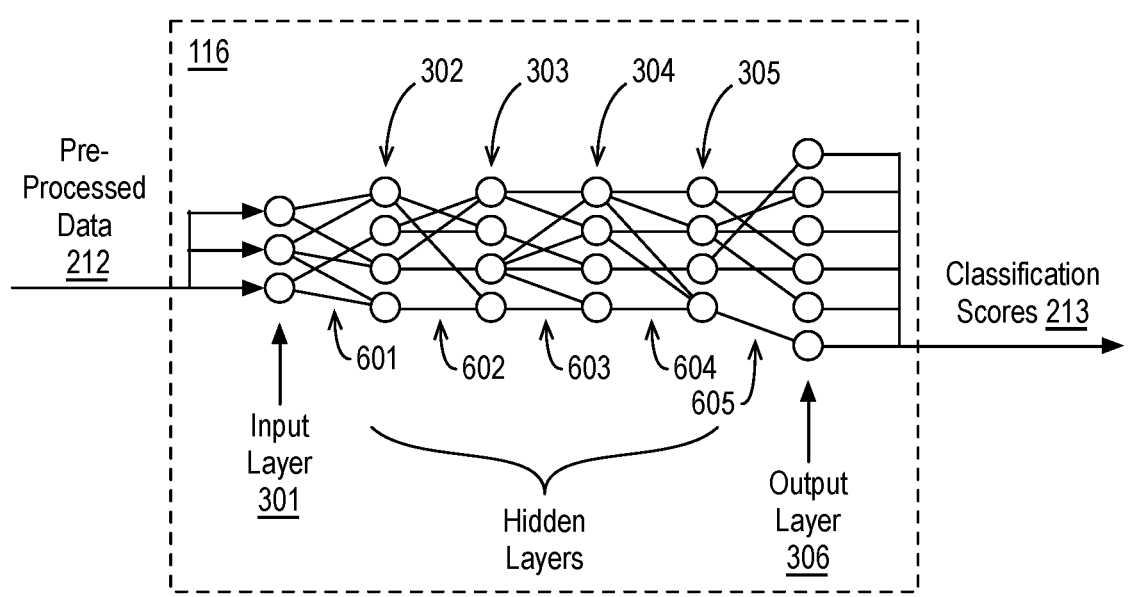
FIG. 6 illustrates an example sparse DNN model.

FIG. 6 illustrates an example sparse DNN model 116, arranged in accordance with at least some implementations of the present disclosure. Sparse DNN model 116 is shown in operation for the sake of clarity of presentation. As shown in FIG. 6 and as discussed with respect to FIG. 3, sparse DNN model 116 may have input layer 301 to receive pre-processed data 212, hidden layers 302-305, and output layer 306 to provide classification scores 213.

Furthermore, sparse DNN model 116 includes connections and weights between only those nodes that were connected after processing by compression module 104. As shown, many of available connections 311-315 have been disconnected such that sparse connections 601-605 are provided. For example, available connections 311-315 may have been pruned/spliced and corresponding weights updated through a number of iterations to generate sparse connections 601-605 of sparse DNN model 116 such that sparse connections 601-605 represent only the important connections between layers 301-306 and such that the corresponding weights have been trained to implement sparse connections 601-605 to provide robust accuracy mapping input data to classification scores such that the accuracy of sparse DNN model 116 is similar to that of reference DNN model 113.

Figure 7:
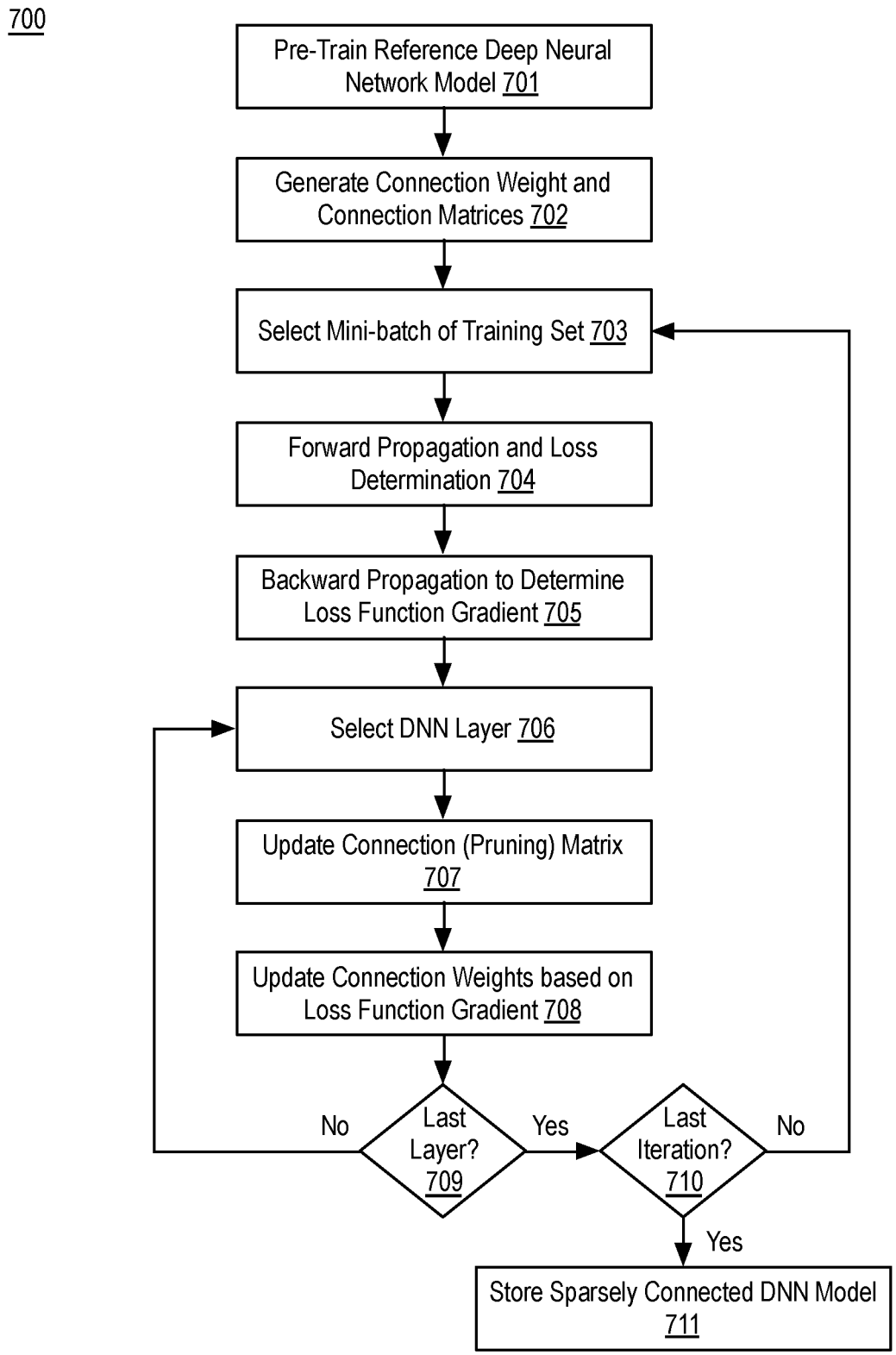
FIG. 7 is a flow diagram illustrating an example process for generating a sparse deep neural network model.

FIG. 7 is a flow diagram illustrating an example process 700 for generating a sparse deep neural network model, arranged in accordance with at least some implementations of the present disclosure. Process 700 may include one or more operations 701-711 as illustrated in FIG. 7. Process 700 may be performed by a device (e.g., device 100, any other devices or systems discussed herein, or an external training device such as a computer device or the like) to generate a sparse deep neural network model. Process 700 or portions thereof may be repeated for any training sets, neural network implementations, or the like.

Process 700 may begin at operation 701, where a reference deep neural network (DNN) model may be pre-trained. The reference DNN model may be pre-trained using any suitable technique or techniques. In an embodiment, a structure may be determined for the reference DNN model including an input layer, a plurality of hidden layers, an output layer, and available connections between the layers and pre-training the reference DNN model may include pre-training the reference DNN model based on a training set of data. The reference DNN model may be pre-trained for any suitable purpose such as, for example, a computer vision application, a face recognition application, a face detection application, an object detection application, a gesture recognition application, a voice detection application, a voice identification application, a speech to recognized series of textual elements application, or the like. In an embodiment, pre-training the reference DNN model includes determining weights for each of the available connections of the reference DNN model.

Processing continues at operation 702, where connection weight matrices and connection matrices may be generated for the DNN model. The connection weight matrices and connection matrices may be generated using any suitable technique or techniques. In an embodiment, the connection weight matrices may be generated by providing a matrix for each connection between layers of the reference DNN model such the each matrix includes the weights for the available connections between the layers. For example, for a fully connected DNN, if a layer has q outputs to a layer having p inputs, the matrix for those adjacent layers may have q×p weights. In an embodiment, the deep neural network is a deep convolutional neural network and the weights of the weight matrices comprise coefficients of each kernel of the convolutional layers. The connection matrices may include matrices corresponding to the connection weight matrices (e.g., having the same number of entries each corresponding to an entry of the connection weight matrices). For a first iteration of processing, the entries of the connection matrices may be set to one or true or the like to indicate all available connections of the DNN model are currently connected.

Processing continues at operation 703, where a mini-batch of a training set may be selected. For example a mini-batch of a full corpus training set may be selected for a current iteration of pruning/splicing and parameter updating for the DNN model. The mini-batch may be selected using any suitable technique or techniques. In an embodiment, the mini-batch is selected from the training set randomly. In an embodiment, a sample index set is provided containing sample indices generated in random and a fixed partition of this set is used to generate respective mini-batches before training. For example, although illustrated in FIG. 7 as occurring at each iteration, such mini-batches may be preselected prior to iterative processing.

Processing continues at operation 704, where the current DNN model may be evaluated using the mini-batch and forward propagation to generate a network loss. The network loss may be determined using any suitable technique or techniques. In an embodiment, the current DNN model may be applied to the mini-batch and the result from the output layer may be compared to the known ground truth output for the mini-batch to determine the network loss.

Processing continues at operation 705, where the current DNN model may be evaluated using backward propagation to generate a loss function gradient. The loss function gradient may be determined using any suitable technique or techniques. In an embodiment, backward propagation may be applied to the current DNN model and, based on known node outputs, the loss function gradient may be determined.

Processing continues at operation 706, where a layer of the current DNN model may be selected. For example, the layers may be selected in a forward manner such that an input layer and a first hidden layer are selected at a first iteration of operation 706, the first hidden layer and a second hidden layer are selected at a second iteration, and so on.

Processing continues at operation 707, where the connection matrix for the current layer of the DNN model may be updated. The connection matrix for the current layer may be updated using any suitable technique or techniques. In an embodiment, weights of the current layer from a previous iteration may be evaluated by a discriminative function to generate a connect/disconnect signal or a connect/disconnect/no change signal for the weights or the like. Based on the discriminative function and the signal the connection matrix may be updated. In an embodiment, a weight from a previous iteration is compared to single threshold such that if the weight compares favorably to the threshold (e.g., the absolute value of the weight is greater than the threshold), a connection is provided (e.g., left connected or reconnected) and if the weight compares unfavorably to the threshold, a connection is not provided (e.g., disconnected). In another embodiment, a weight from a previous iteration is compared to two thresholds such that if the weight compares unfavorably to the first threshold (e.g., the absolute value of the weight is less than the first threshold), a connection is not provided (e.g., disconnected), if the weight compares favorably to the second threshold (e.g., the absolute value of the weight is greater than the second threshold), a connection is provided (e.g., left connected or reconnected) and if the weight is between the first and second thresholds, no change to the connection status is made.

Processing continues at operation 708, where the connection weight matrix for the current layer of the DNN model may be updated. The connection weight matrix for the current layer may be updated using any suitable technique or techniques. In an embodiment, each connection weight may be provided based on a positive learning rate parameter and the gradient of the loss function. In an embodiment, each connection weight may be provided as a product of the positive learning rate parameter and a partial derivative of the loss function. In an embodiment, each connection weight may be provided based on Equation (4) above.

Processing continues at decision operation 709, where a determination may be made as to whether the current layer of the DNN model is the last layer of the DNN model. If not, processing may continue at operations 706-708 until the connection matrices and the connection weight matrices are updated for each layer of the DNN. If so, processing continues at decision operation 710, where a determination may be made as to whether the last iteration of pruning/splicing and weight updating has been performed. If not, processing may continue at operations 706-708 until a final iteration has been reached. If so, processing may continue at operation 711, where the sparsely connected DNN model may be stored to memory for implementation. The number of iterations may be a preset value in the range of about 500,000 to 800,000 iterations or the like. In an embodiment, the preset value of iterations may be about 800,000 for AlexNet, which includes 8 layers and 60 million parameters.

Furthermore, as discussed herein, process 700 may include, for each iteration or for some iterations, a determination as to whether operation 707 (e.g., pruning/splicing) are to be performed. For example, a pruning and splicing activation indicator may be determined for a current indicator as discussed herein and pruning and splicing may only be applied when the indicator indicates pruning and splicing are to applied for the current iteration.

Figure 8:
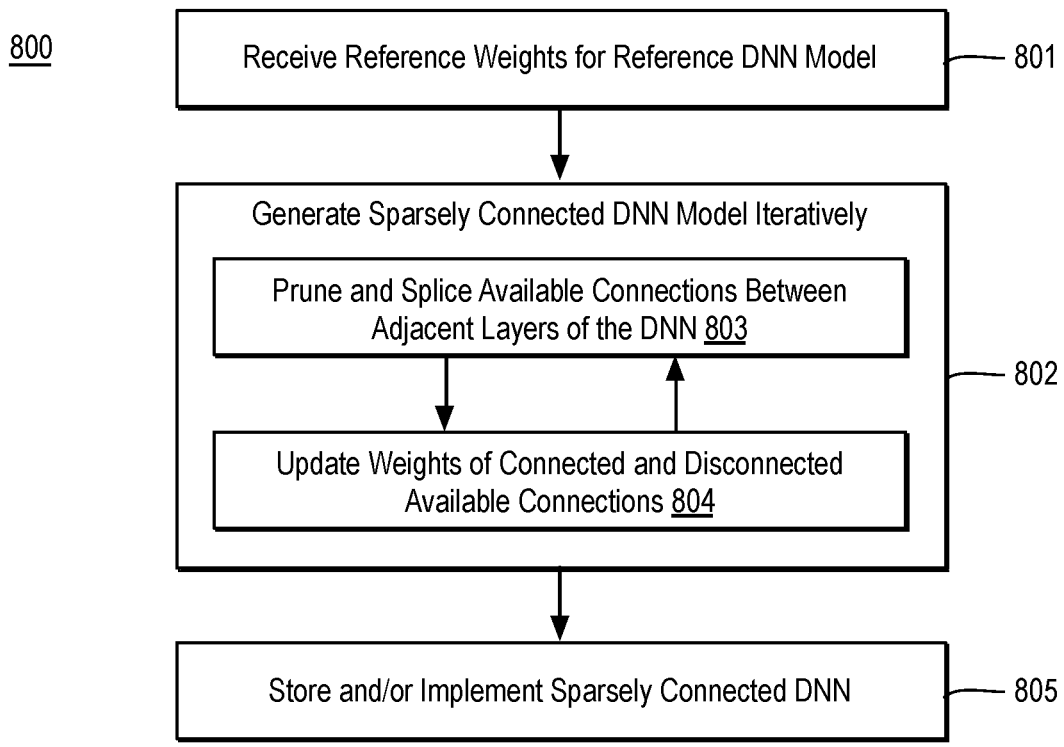
FIG. 8 is a flow diagram illustrating an example process for compressing a deep neural network.

FIG. 8 is a flow diagram illustrating an example process 800 for compressing a pre-trained deep neural network, arranged in accordance with at least some implementations of the present disclosure. Process 800 may include one or more operations 801-805 as illustrated in FIG. 8. Process 800 may form at least part of a deep neural network compression process. By way of non-limiting example, process 800 may form at least part of a deep neural network compression process performed by device 100 as discussed herein. Furthermore, process 800 will be described herein with reference to system 900 of FIG. 9.

Figure 9:
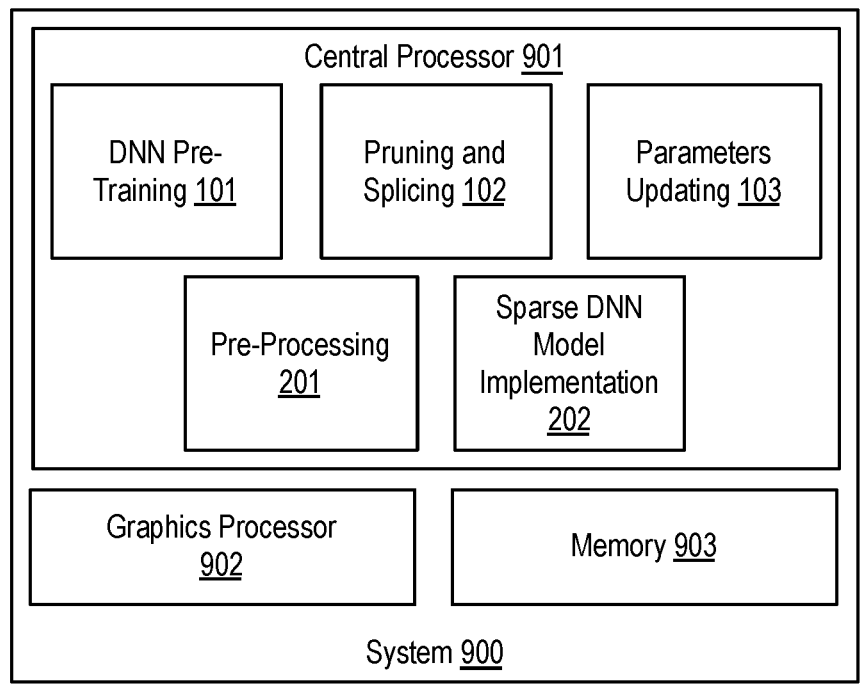
FIG. 9 is an illustrative diagram of an example system for compressing a deep neural network.

FIG. 9 is an illustrative diagram of an example system 900 for compressing a pre-trained deep neural network, arranged in accordance with at least some implementations of the present disclosure. As shown in FIG. 9, system 900 may include one or more central processors 901, a graphics processor 902, and memory 903. Also as shown, central processor 901 may include or implement DNN pre-training module 101, pruning and splicing module 102, parameters updating module 103, pre-processing module 201, and sparse DNN model implementation module 202. Such modules may be implemented to perform operations as discussed herein. In the example of system 900, memory 903 may store DNN model data, training set data, reference DNN model weights, biases, or parameters, connection matrices, weight matrices, thresholds, sparse DNN model weights or parameters, input data, classification scores, or any other data discussed herein.

As shown, in some examples, DNN pre-training module 101, pruning and splicing module 102, parameters updating module 103, pre-processing module 201, and sparse DNN model implementation module 202 module 102 may be implemented via central processor 901. In other examples, one or more or portions of DNN pre-training module 101, pruning and splicing module 102, parameters updating module 103, pre-processing module 201, and sparse DNN model implementation module 202 may be implemented via graphics processor 902 or an image processing unit (not shown) of system 900. In yet other examples, one or more or portions DNN pre-training module 101, pruning and splicing module 102, parameters updating module 103, pre-processing module 201, and sparse DNN model implementation module 202 may be implemented via processing pipeline or the like.

Graphics processor 902 may include any number and type of graphics processing units, that may provide the operations as discussed herein. Such operations may be implemented via software or hardware or a combination thereof. For example, graphics processor 902 may include circuitry dedicated to manipulate DNN data or the like obtained from memory 903. Central processor may include any number and type of processing units or modules that may provide control and other high level functions for system 900 and/or provide any operations as discussed herein. Memory 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 903 may be implemented by cache memory.

In an embodiment, one or more or portions DNN pre-training module 101, pruning and splicing module 102, parameters updating module 103, pre-processing module 201, and sparse DNN model implementation module 202 may be implemented via an execution unit (EU) of graphics processor 902. The EU may include, for example, programmable logic or circuitry such as a logic core or cores that may provide a wide array of programmable logic functions. In an embodiment, one or more or portions DNN pre-training module 101, pruning and splicing module 102, parameters updating module 103, pre-processing module 201, and sparse DNN model implementation module 202 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions DNN pre-training module 101, pruning and splicing module 102, parameters updating module 103, pre-processing module 201, and sparse DNN model implementation module 202 may be implemented via an application specific integrated circuit (ASIC). The ASIC may include an integrated circuitry customized to perform the operations discussed herein.

Returning to discussion of FIG. 8, process 800 may begin at operation 801, where reference weights corresponding to available connections of a reference deep neural network model are received. For example, the deep neural network model may include an input layer, a plurality of hidden layers, an output layer, and available connections between the layers. The reference weights may be generated using any suitable technique or techniques. In an embodiment, the deep neural network model may be pre-trained based on a training data set to determine the reference weights. In an embodiment, DNN pre-training module 101 as implemented by central processor 901 generates the reference weights by pre-training an initial DNN based on a training data set. In an embodiment, the reference weights are received from a remote device. In an embodiment, the reference weights are received from memory 903.

Processing may continue at operation 802, where a sparsely connected DNN model may be generated by iteratively performing operations 803 and 804. At operation 803, at each or some iterations, available connections between adjacent layers of the DNN are pruned and/or spliced. At operation 804, at each or some iteration, weights of both connected and disconnected available connections are updated. In an embodiment, operation 803 may be performed by pruning and splicing module 102 as implemented by central processor 901. In an embodiment, operation 804 may be performed by parameters updating module 103 as implemented by central processor 901.

Such iterative pruning and splicing of available connections and updating parameters or weights may be performed using any suitable technique or techniques. In an embodiment, pruning and splicing includes pruning and splicing one or more of multiple available connections between at least two adjacent layers of the deep neural network model such that pruning includes disconnecting at least one connection of the available connections and splicing includes reconnecting at least one connection of the available connections that was disconnected in a previous iteration. In an embodiment, updating the weights includes updating weights corresponding to both the currently disconnected and the currently connected connections of the available connections between the two adjacent layers as discussed herein.

In an embodiment, iteratively pruning and splicing the available connections and updating the weights includes generating a current iteration connection matrix including indicators each indicating whether a corresponding available connection between the two layers is connected or not connected and updating the previous iteration connection weights based on a loss function gradient to generate multiple current iteration connection weights between the two adjacent layers. For example, generating the current iteration connection matrix may include applying, to each of multiple previous iteration connection weights each corresponding to one of the plurality of available connections, a discriminative function to determine each indicator of the current iteration connection matrix. The discriminative function may include any suitable discriminative function. In an embodiment, applying the discriminative function includes comparing an individual previous iteration connection weight to a threshold and providing a disconnect indicator when the individual previous iteration connection weight compares unfavorably to the threshold. In an embodiment, applying the discriminative function comprises comparing an individual previous iteration connection weight to a first threshold and a second threshold greater than first threshold and providing a disconnect indicator when the individual previous iteration connection weight compares unfavorably to the first threshold, a connect indicator when the individual previous iteration connection weight compares favorably to the second threshold, and, otherwise, a no change indicator.

In an embodiment, iteratively pruning and splicing the available connections and updating the weights includes iteratively pruning and splicing available connections and updating weights between all adjacent layers of the deep neural network model by applying a current iteration deep neural network model to a training data set, determining a network loss based on the application of the current iteration deep neural network model to the training data set, generating a loss function gradient based on the current iteration deep neural network model, and, for each hidden layer and the output layer of the current iteration deep neural network model generating a current iteration connection matrix based on a previous matrix of connection weights and updating the previous matrix of connection weights to a current matrix of connection weights based on the previous matrix of connection weights and the loss function gradient. As discussed, the deep neural network model may be pre-trained based on a training set to determine the reference weights. In an embodiment, training data set for iterative processing is a randomly selected subset of the training data set used to determine the reference weights.

In some embodiments, the pruning and splicing of operation 803 may be performed at each iteration. In other embodiments, pruning and splicing may be performed only at some iterations. In an embodiment, the pruning and splicing may be performed at a particular frequency of iterations (e.g., at every $x^{th}$ iteration). In an embodiment, iteratively pruning and splicing available connections and updating the weights includes stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration. In an embodiment, wherein stochastically determining the pruning and splicing indicator includes applying a probability function based on the iteration number of the current iteration. For example, the probability function may be a monotonically non-increasing probability function.

The reference deep neural network discussed with respect to operation 801 and the sparsely connected deep neural network generated at operation 802 may be any suitable deep neural network structure. In an embodiment, the deep neural network is a deep fully connected neural network. In an embodiment, the deep neural network is a deep convolutional neural network. In an embodiment, the deep neural network is a deep recurrent neural network.

Processing may continue at operation 803, where the sparsely connected deep neural network model may be stored and/or implemented. For example, the sparsely connected deep neural network model includes final iteration weights for only connected connections of the available connections between the two adjacent layers at a final iteration. In an embodiment, the sparsely connected deep neural network model is stored to memory 903. In an embodiment, the sparsely connected deep neural network model may be transmitted to another device for storage or implementation.

In an embodiment, the sparsely connected deep neural network model is stored for use by an artificial intelligence processing application and process 800 further includes implementing the sparsely connected deep neural network model by the artificial intelligence processing application. In an embodiment, the sparsely connected deep neural network model may be implemented by sparse DNN model implementation module 202 as implemented by central processor 901. In an embodiment, the sparsely connected deep neural network model may be implemented based on pre-processed data generated by pre-processing module 201 as implemented by central processor 901. The input data operated on by the sparsely connected deep neural network model may be any suitable input data and the sparsely connected deep neural network model may provide any suitable output data such as scores, scoring data, classification scores, likelihood data, or the like.

In an embodiment, an artificial intelligence processing application implementing the sparsely connected deep neural network model receives input data for classification and classifies the input data, based in part on the sparsely connected deep neural network model, to generate classification data The artificial intelligence processing application may include an suitable application such as a computer vision application, a face recognition application, a face detection application, an object detection application, a gesture recognition application, a voice detection application, a voice identification application, a speech to recognized series of textual elements application, or the like.

Process 800 may provide for compression of a pre-trained deep neural network and/or implementation of the resultant sparsely connected deep neural network. Process 800 may be repeated any number of times either in series or in parallel for any number of deep neural networks. As discussed, process 800 may provide for a sparse deep neural network that may be implemented with reduced memory, computational, and power requirements and with high accuracy.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of devices systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
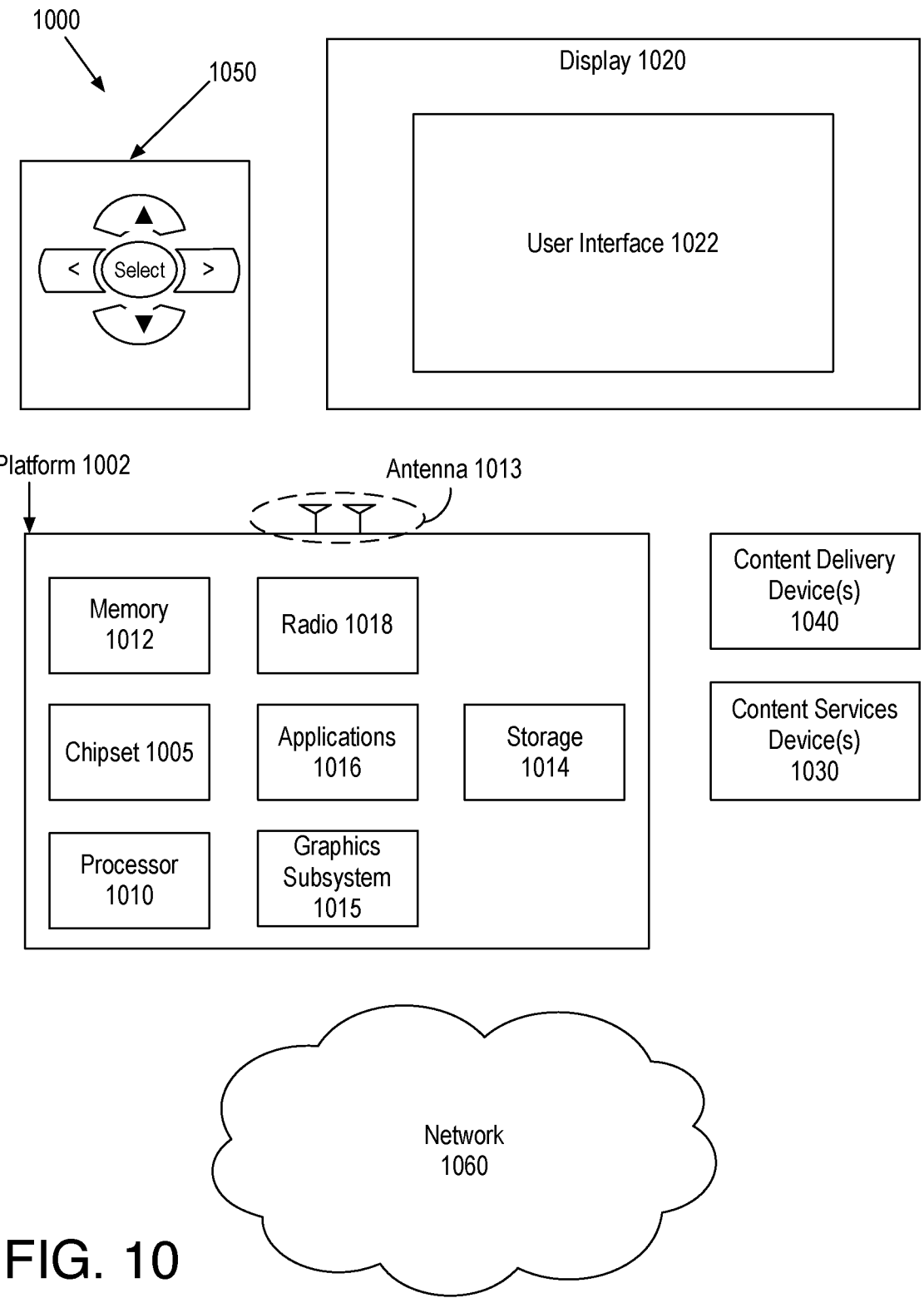
FIG. 10 is an illustrative diagram of an example system.

FIG. 10 is an illustrative diagram of an example system 1000, arranged in accordance with at least some implementations of the present disclosure. In various implementations, system 1000 may be a computing system although system 1000 is not limited to this context. For example, system 1000 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1000 includes a platform 1002 coupled to a display 1020. Platform 1002 may receive content from a content device such as content services device(s) 1030 or content delivery device(s) 1040 or other similar content sources such as a camera or camera module or the like. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still images, graphics, or video for display. Graphics subsystem 1015 may be a graphics processing unit (GPU), a visual processing unit (VPU), or an image processing unit, for example. In some examples, graphics subsystem 1015 may perform scanned image rendering as discussed herein. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any flat panel monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
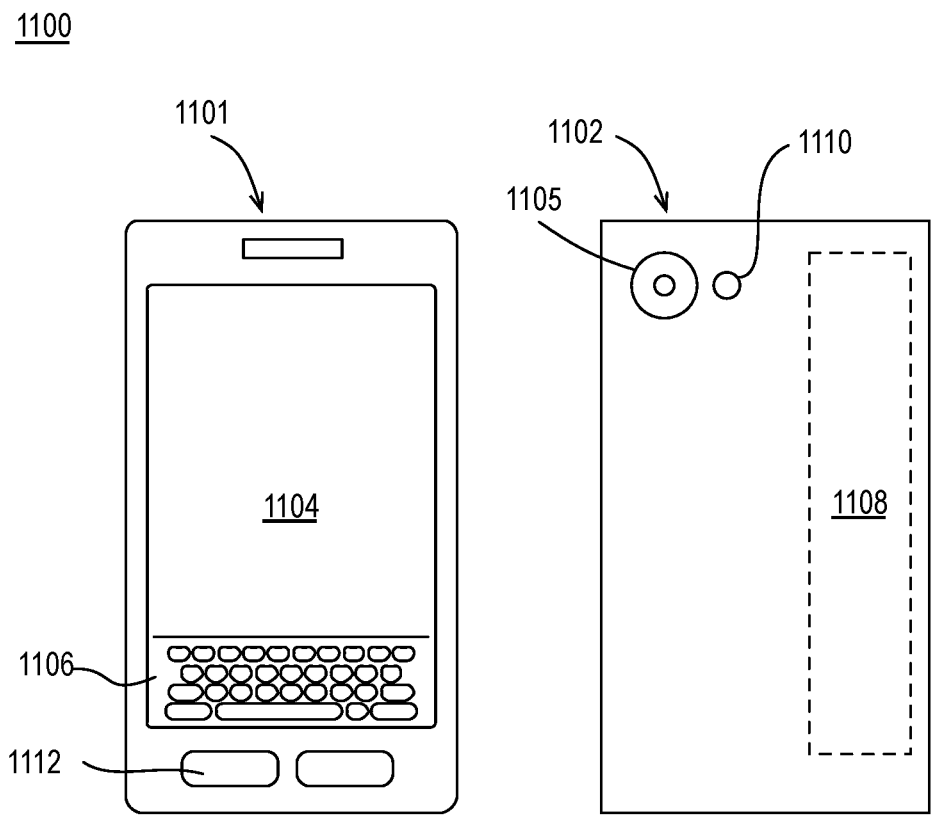
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, any device or system discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for compressing a pre-trained deep neural network comprises receiving, for a deep neural network model having an input layer, a plurality of hidden layers, an output layer, and available connections between the layers, reference weights corresponding to the available connections, generating a sparsely connected deep neural network model based on the deep neural network model by iteratively pruning and splicing one or more of a plurality of available connections between at least two adjacent layers of the deep neural network model, wherein said pruning comprises disconnecting at least a first connection of the available connections between the two adjacent layers and said splicing comprises reconnecting at least a second connection of the available connections between the two adjacent layers, wherein the second connection was disconnected in a previous iteration and updating weights corresponding to both the currently disconnected and the currently connected connections of the available connections between the two adjacent layers, and storing the sparsely connected deep neural network model, wherein the sparsely connected deep neural network model comprises final iteration weights for only connected connections of the available connections between the two adjacent layers at a final iteration.

Further to the first embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers.

Further to the first embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers such that applying the discriminative function comprises comparing an individual previous iteration connection weight to a threshold and providing a disconnect indicator when the individual previous iteration connection weight compares unfavorably to the threshold.

Further to the first embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers such that applying the discriminative function comprises comparing an individual previous iteration connection weight to a first threshold and a second threshold greater than first threshold and providing a disconnect indicator when the individual previous iteration connection weight compares unfavorably to the first threshold, a connect indicator when the individual previous iteration connection weight compares favorably to the second threshold, and, otherwise, a no change indicator.

Further to the first embodiments, iteratively pruning and splicing the available connections and updating the weights comprises iteratively pruning and splicing available connections and updating weights between all adjacent layers of the deep neural network model by applying a current iteration deep neural network model to a training data set, determining a network loss based on the application of the current iteration deep neural network model to the training data set, generating a loss function gradient based on the current iteration deep neural network model, and for each hidden layer and the output layer of the current iteration deep neural network model generating a current iteration connection matrix based on a previous matrix of connection weights and updating the previous matrix of connection weights to a current matrix of connection weights based on the previous matrix of connection weights and the loss function gradient.

Further to the first embodiments, iteratively pruning and splicing the available connections and updating the weights comprises iteratively pruning and splicing available connections and updating weights between all adjacent layers of the deep neural network model by applying a current iteration deep neural network model to a training data set, determining a network loss based on the application of the current iteration deep neural network model to the training data set, generating a loss function gradient based on the current iteration deep neural network model, and for each hidden layer and the output layer of the current iteration deep neural network model generating a current iteration connection matrix based on a previous matrix of connection weights and updating the previous matrix of connection weights to a current matrix of connection weights based on the previous matrix of connection weights and the loss function gradient, and the method further comprises pre-training the deep neural network model based on a first training data set to determine the reference weights such that the training data set is a randomly selected subset of the first training data set.

Further to the first embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration.

Further to the first embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration such that stochastically determining the pruning and splicing indicator comprises applying a probability function based on the iteration number of the current iteration such that the probability function is a monotonically non-increasing probability function.

Further to the first embodiments, the deep neural network comprises a deep fully connected neural network, a deep convolutional neural network, or a deep recurrent neural network.

Further to the first embodiments, the deep neural network comprises a deep convolutional neural network and the weights comprise coefficients of each kernel of the convolutional layer of the two adjacent layers.

Further to the first embodiments, the sparsely connected deep neural network model is stored for use by an artificial intelligence processing application and the method further comprises implementing the sparsely connected deep neural network model by the artificial intelligence processing application, wherein the artificial intelligence processing application receives input data for classification and classifies the input data to generate classification data, the artificial intelligence processing application comprising at least one of a computer vision application, a face recognition application, a face detection application, an object detection application, a gesture recognition application, a voice detection application, a voice identification application, or a speech to recognized series of textual elements application.

In one or more second embodiments, a for compressing a pre-trained deep neural network comprises memory to store a deep neural network model having an input layer, a plurality of hidden layers, an output layer, and available connections between the layers, reference weights corresponding to the available connections and a processor coupled to the memory, the processor to generate a sparsely connected deep neural network model based on the deep neural network model, wherein to generate the sparsely connected deep neural network model, the processor is to iteratively prune and splice one or more of a plurality of available connections between at least two adjacent layers of the deep neural network model, wherein to prune comprises the processor to disconnect at least a first connection of the available connections between the two adjacent layers and to splice comprises the processor reconnecting at least a second connection of the available connections between the two adjacent layers, wherein the second connection was disconnected in a previous iteration and update weights corresponding to both the currently disconnected and the currently connected connections of the available connections between the two adjacent layers, and store the sparsely connected deep neural network model to the memory, wherein the sparsely connected deep neural network model comprises final iteration weights for only connected connections of the available connections between the two adjacent layers at a final iteration.

Further to the second embodiments, to iteratively prune and splice the available connections and update the weights comprises the processor to generate a current iteration connection matrix comprising a plurality of indicators each indicating whether a corresponding available connection between the two layers is connected or not connected, wherein to generate the current iteration connection matrix comprises the processor to apply, to each of a plurality of previous iteration connection weights each corresponding to one of the plurality of available connections, a discriminative function to determine each indicator of the current iteration connection matrix and update the previous iteration connection weights based on a loss function gradient to generate a plurality of current iteration connection weights between the two adjacent layers.

Further to the second embodiments, to iteratively prune and splice the available connections and update the weights comprises the processor to generate a current iteration connection matrix comprising a plurality of indicators each indicating whether a corresponding available connection between the two layers is connected or not connected, wherein to generate the current iteration connection matrix comprises the processor to apply, to each of a plurality of previous iteration connection weights each corresponding to one of the plurality of available connections, a discriminative function to determine each indicator of the current iteration connection matrix and update the previous iteration connection weights based on a loss function gradient to generate a plurality of current iteration connection weights between the two adjacent layers such that to apply the discriminative function comprises the processor to compare an individual previous iteration connection weight to a threshold and to provide a disconnect indicator when the individual previous iteration connection weight compares unfavorably to the threshold.

Further to the second embodiments, to iteratively prune and splice the available connections and update the weights comprises the processor to generate a current iteration connection matrix comprising a plurality of indicators each indicating whether a corresponding available connection between the two layers is connected or not connected, wherein to generate the current iteration connection matrix comprises the processor to apply, to each of a plurality of previous iteration connection weights each corresponding to one of the plurality of available connections, a discriminative function to determine each indicator of the current iteration connection matrix and update the previous iteration connection weights based on a loss function gradient to generate a plurality of current iteration connection weights between the two adjacent layers such that to apply the discriminative function comprises the processor to compare an individual previous iteration connection weight to a first threshold and a second threshold greater than first threshold and to provide a disconnect indicator when the individual previous iteration connection weight compares unfavorably to the first threshold, a connect indicator when the individual previous iteration connection weight compares favorably to the second threshold, and, otherwise, a no change indicator.

Further to the second embodiments, to iteratively prune and splice the available connections and update the weights comprises the processor to iteratively prune and splice available connections and update weights between all adjacent layers of the deep neural network model by the processor being configured to apply a current iteration deep neural network model to a training data set, determine a network loss based on the application of the current iteration deep neural network model to the training data set, generate a loss function gradient based on the current iteration deep neural network model, and for each hidden layer and the output layer of the current iteration deep neural network model generate a current iteration connection matrix based on a previous matrix of connection weights and update the previous matrix of connection weights to a current matrix of connection weights based on the previous matrix of connection weights and the loss function gradient.

Further to the second embodiments, to iteratively prune and splice the available connections and update the weights comprises the processor to iteratively prune and splice available connections and update weights between all adjacent layers of the deep neural network model by the processor being configured to apply a current iteration deep neural network model to a training data set, determine a network loss based on the application of the current iteration deep neural network model to the training data set, generate a loss function gradient based on the current iteration deep neural network model, and for each hidden layer and the output layer of the current iteration deep neural network model generate a current iteration connection matrix based on a previous matrix of connection weights and update the previous matrix of connection weights to a current matrix of connection weights based on the previous matrix of connection weights and the loss function gradient, and the processor is further to pre-train the deep neural network model based on a first training data set to determine the reference weights, wherein the training data set is a randomly selected subset of the first training data set.

Further to the second embodiments, to iteratively prune and splice available connections and update the weights comprises the processor to stochastically determine, for a current iteration, a pruning and splicing activation indicator indicating whether pruning and splicing are to be applied for the current iteration and only prune and splice available connections when the pruning and splicing activation indicator indicates pruning and splicing are to be applied for the current iteration.

Further to the second embodiments, to iteratively prune and splice available connections and update the weights comprises the processor to stochastically determine, for a current iteration, a pruning and splicing activation indicator indicating whether pruning and splicing are to be applied for the current iteration and only prune and splice available connections when the pruning and splicing activation indicator indicates pruning and splicing are to be applied for the current iteration such that to stochastically determine the pruning and splicing indicator comprises the processor to apply a probability function based on the iteration number of the current iteration such that the probability function is a monotonically non-increasing probability function.

Further to the second embodiments, the deep neural network comprises a deep fully connected neural network, a deep convolutional neural network, or a deep recurrent neural network.

Further to the second embodiments, the deep neural network comprises a deep convolutional neural network and the weights comprise coefficients of each kernel of the convolutional layer of the two adjacent layers.

Further to the second embodiments, the sparsely connected deep neural network model is stored for use by an artificial intelligence processing application and the processor is further to implement the sparsely connected deep neural network model by the artificial intelligence processing application, wherein the artificial intelligence processing application receives input data for classification and classifies the input data to generate classification data, the artificial intelligence processing application comprising at least one of a computer vision application, a face recognition application, a face detection application, an object detection application, a gesture recognition application, a voice detection application, a voice identification application, or a speech to recognized series of textual elements application.

In one or more third embodiments, a system comprises means for receiving, for a deep neural network model having an input layer, a plurality of hidden layers, an output layer, and available connections between the layers, reference weights corresponding to the available connections, means for generating a sparsely connected deep neural network model based on the deep neural network model by iteratively pruning and splicing one or more of a plurality of available connections between at least two adjacent layers of the deep neural network model, wherein said pruning comprises disconnecting at least a first connection of the available connections between the two adjacent layers and said splicing comprises reconnecting at least a second connection of the available connections between the two adjacent layers, wherein the second connection was disconnected in a previous iteration and updating weights corresponding to both the currently disconnected and the currently connected connections of the available connections between the two adjacent layers, and means for storing the sparsely connected deep neural network model, wherein the sparsely connected deep neural network model comprises final iteration weights for only connected connections of the available connections between the two adjacent layers at a final iteration.

Further to the third embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers.

Further to the third embodiments, applying the discriminative function comprises comparing an individual previous iteration connection weight to a first threshold and a second threshold greater than first threshold and providing a disconnect indicator when the individual previous iteration connection weight compares unfavorably to the first threshold, a connect indicator when the individual previous iteration connection weight compares favorably to the second threshold, and, otherwise, a no change indicator.

Further to the third embodiments, iteratively pruning and splicing the available connections and updating the weights comprises iteratively pruning and splicing available connections and updating weights between all adjacent layers of the deep neural network model by applying a current iteration deep neural network model to a training data set, determining a network loss based on the application of the current iteration deep neural network model to the training data set, generating a loss function gradient based on the current iteration deep neural network model, and for each hidden layer and the output layer of the current iteration deep neural network model generating a current iteration connection matrix based on a previous matrix of connection weights and updating the previous matrix of connection weights to a current matrix of connection weights based on the previous matrix of connection weights and the loss function gradient.

Further to the third embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration.

Further to the third embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration such that stochastically determining the pruning and splicing indicator comprises applying a probability function based on the iteration number of the current iteration such that the probability function is a monotonically non-increasing probability function.

Further to the third embodiments, the deep neural network comprises a deep convolutional neural network and the weights comprise coefficients of each kernel of the convolutional layer of the two adjacent layers.

In one or more fourth embodiments, at least one machine readable medium comprises a plurality of instructions that, in response to being executed on a computing device, cause the computing device to compress a deep neural network by receiving, for a deep neural network model having an input layer, a plurality of hidden layers, an output layer, and available connections between the layers, reference weights corresponding to the available connections, generating a sparsely connected deep neural network model based on the deep neural network model by iteratively pruning and splicing one or more of a plurality of available connections between at least two adjacent layers of the deep neural network model, wherein said pruning comprises disconnecting at least a first connection of the available connections between the two adjacent layers and said splicing comprises reconnecting at least a second connection of the available connections between the two adjacent layers, wherein the second connection was disconnected in a previous iteration and updating weights corresponding to both the currently disconnected and the currently connected connections of the available connections between the two adjacent layers, and storing the sparsely connected deep neural network model, wherein the sparsely connected deep neural network model comprises final iteration weights for only connected connections of the available connections between the two adjacent layers at a final iteration.

Further to the fourth embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers.

Further to the fourth embodiments, iteratively pruning and splicing the available connections and updating the weights comprises generating a current iteration connection matrix comprising a plurality of indicators each indicating whether a corresponding available connection between the two layers is connected or not connected, wherein generating the current iteration connection matrix comprises applying, to each of a plurality of previous iteration connection weights each corresponding to one of the plurality of available connections, a discriminative function to determine each indicator of the current iteration connection matrix and updating the previous iteration connection weights based on a loss function gradient to generate a plurality of current iteration connection weights between the two adjacent layers such that applying the discriminative function comprises comparing an individual previous iteration connection weight to a threshold and providing a disconnect indicator when the individual previous iteration connection weight compares unfavorably to the threshold.

Further to the fourth embodiments, iteratively pruning and splicing the available connections and updating the weights comprises iteratively pruning and splicing available connections and updating weights between all adjacent layers of the deep neural network model by applying a current iteration deep neural network model to a training data set, determining a network loss based on the application of the current iteration deep neural network model to the training data set, generating a loss function gradient based on the current iteration deep neural network model, and for each hidden layer and the output layer of the current iteration deep neural network model generating a current iteration connection matrix based on a previous matrix of connection weights and updating the previous matrix of connection weights to a current matrix of connection weights based on the previous matrix of connection weights and the loss function gradient.

Further to the fourth embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration.

Further to the fourth embodiments, iteratively pruning and splicing available connections and updating the weights comprises stochastically determining, for a current iteration, a pruning and splicing activation indicator indicating whether pruning and splicing are to be applied for the current iteration and only pruning and splicing available connections when the pruning and splicing activation indicator indicates pruning and splicing are to be applied for the current iteration such that stochastically determining the pruning and splicing indicator comprises applying a probability function based on the iteration number of the current iteration such that the probability function is a monotonically non-increasing probability function Further to the fourth embodiments, the deep neural network comprises a deep convolutional neural network and the weights comprise coefficients of each kernel of the convolutional layer of the two adjacent layers.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for compressing a deep neural network, comprising:
receiving weights of the deep neural network, the deep neural network having layers that comprise an input layer, one or more hidden layers, and an output layer, the weights corresponding to available connections between the layers;
generating a sparsely connected deep neural network by disconnecting a connection of the available connections based on a value of a weight corresponding to the connection, wherein the connection is between a first node of a first layer and a second node of a second layer, and both the first node and the second node are maintained in the sparsely connected deep neural network; and
generating another sparsely connected deep neural network by:
after disconnecting the connection, updating the value of the weight corresponding to the connection between the first node and the second node by further training the sparsely connected deep neural network, determining whether the updated value of the weight is above a threshold, and in response to determining that the updated value of the weight is above the threshold, reconnecting the connection between the first node and the second node, wherein the another sparsely connected deep neural network, comprises the connection between the first node and the second node and has less available connections than the deep neural network.

2. The method of claim 1, further comprising:
generating a connection matrix comprising a plurality of indicators each indicating whether a corresponding available connection between two layers is connected or not connected, wherein generating the connection matrix comprises applying a discriminative function onto the weights of the deep neural network to determine each indicator of the connection matrix; and
updating the connection matrix after the value of the weight is updated.

3. The method of claim 2, wherein applying the discriminative function comprises:
comparing an individual weight to the threshold; and
including a disconnect indicator in the connection matrix after a determination that the individual weight is below the threshold.

4. The method of claim 2, wherein applying the discriminative function comprises:
comparing an individual weight to a first threshold and to a second threshold greater than first threshold; and
including a disconnect indicator in the connection matrix after a determination that the individual weight is below the first threshold, or including a connect indicator in the connection matrix after a determination that the individual weight is above the second threshold.

5. The method of claim 1, wherein updating the value of the weight comprises:
inputting a training data set into the sparsely connected deep neural network;
determining a network loss based on the training data set and the weights corresponding to the available connections; and
updating the value of the weight based on the network loss.

6. The method of claim 5, wherein the training data set is a first training data set, the method further comprises:
before generating the sparsely connected deep neural network, training the deep neural network based on a second training data set to determine values of the weights corresponding to the available connections, wherein the first training data set is a subset of the second training data set.

7. The method of claim 1, wherein the sparsely connected deep neural network and the another sparsely connected deep neural network are generated in an iteration of an iterative compressing process, and the iterative compressing process comprises:
stochastically determining, for the iteration, an activation indicator indicating whether to compress the deep neural network in the iteration; and
generating the sparsely connected deep neural network and the another sparsely connected deep neural network when activation indicator indicates to compress the deep neural network in the iteration.

8. The method of claim 7, wherein stochastically determining the activation indicator comprises applying a probability function based on an iteration number of the iteration, and the probability function is a monotonically non-increasing probability function.

9. The method of claim 1, wherein the deep neural network comprises a fully connected neural network, a convolutional neural network, or a recurrent neural network.

10. The method of claim 1, wherein the deep neural network comprises a convolutional neural network, and the weights comprise coefficients of a kernel of the convolutional layer.

11. The method of claim 1, wherein the sparsely connected deep neural network is
to receive input data for classification and to generate classification data.

12. The method of claim 1, wherein the first node or the second node has at least one other connection to another node.

13. A system for compressing a deep neural network comprising:
memory to store weights of the deep neural network, the deep neural network having layers that comprise an input layer, one or more hidden layers, and an output layer, the weights corresponding to available connections between the layers; and
a processor or processor circuitry coupled to the memory, the processor or processor circuitry to:
generate a sparsely connected deep neural network by disconnecting a connection of the available connections based on a value of a weight corresponding to the connection, wherein the connection is between a first node of a first layer and a second node of a second layer, and both the first node and the second node are maintained in the sparsely connected deep neural network, and
generate another sparsely connected deep neural network by:
after disconnecting the connection, updating the value of the weight corresponding to the connection between the first node and the second node by further training the sparsely connected deep neural network,
determining whether the updated value of the weight is above a threshold, and
in response to determining that the updated value of the weight is above the threshold, reconnecting the connection between the first node and the second node,
wherein the another sparsely connected deep neural network comprises the connection between the first node and the second node and has less available connections than the deep neural network.

14. The system of claim 13, wherein the processor or processor circuitry is further to:
generate a connection matrix comprising a plurality of indicators each indicating whether a corresponding available connection between two layers is connected or not connected, wherein generating the connection matrix comprises applying a discriminative function onto the weights of the deep neural network to determine each indicator of the connection matrix; and
update the connection matrix after the value of the weight is updated.

15. The system of claim 14, wherein to apply the discriminative function comprises the processor or processor circuitry to:
compare an individual weight to a first threshold and to a second threshold greater than first threshold; and
include a disconnect indicator in the connection matrix after a determination that the individual weight is below the first threshold, or include a connect indicator in the connection matrix after a determination that the individual weight is above the second threshold.

16. The system of claim 13, wherein updating the value of the weight comprises:
inputting a training data set into the sparsely connected deep neural network;
determining a network loss based on the training data set and the weights corresponding to the available connections; and
updating the value of the weight based on the network loss.

17. The system of claim 13, wherein the sparsely connected deep neural network and the another sparsely connected deep neural network are generated in an iteration of an iterative compressing process, and the iterative compressing process comprises:
stochastically determining, for the iteration, an activation indicator indicating whether to compress the deep neural network in the iteration; and
generating the sparsely connected deep neural network and the another sparsely connected deep neural network when the activation indicator indicates to compress the deep neural network in the iteration.

18. The system of claim 17, wherein to stochastically determine the activation indicator comprises the processor or processor circuitry to apply a probability function based on an iteration number of the iteration, and the probability function is a monotonically non-increasing probability function.

19. The system of claim 13, wherein the deep neural network comprises a convolutional neural network, and the weights comprise coefficients of a kernel of the convolutional layer.

20. At least one non-transitory machine readable medium comprising a plurality of instructions that, in response to being executed on a computing device, cause the computing device to compress a deep neural network by:
receiving weights of the deep neural network, the deep neural network having layers that comprise an input layer, one or more hidden layers, and an output layer, the weights corresponding to available connections between the layers;
generating a sparsely connected deep neural network by disconnecting a connection of the available connections based on a value of a weight corresponding to the connection, wherein the connection is between a first node of a first layer and a second node of a second layer, and both the first node and the second node are maintained in the sparsely connected deep neural network; and
generating another sparsely connected deep neural network by:
after disconnecting the connection, updating the value of the weight corresponding to the connection between the first node and the second node by further training the sparsely connected deep neural network,
determining whether the updated value of the weight is above a threshold, and
in response to determining that the updated value of the weight is above the threshold, reconnecting the connection between the first node and the second node,
wherein the another sparsely connected deep neural network, comprises the connection between the first node and the second node and has less available connections than the deep neural network.

21. The non-transitory machine readable medium of claim 20, wherein compressing the deep neural network further comprises:
generating a connection matrix comprising a plurality of indicators each indicating whether a corresponding available connection between two layers is connected or not connected, wherein generating the connection matrix comprises applying a discriminative function onto the weights of the deep neural network to determine each indicator of the connection matrix; and
updating the connection matrix after the value of the weight is updated.

22. The non-transitory machine readable medium of claim 21, wherein applying the discriminative function comprises:
comparing an individual weight to the threshold; and
including a disconnect indicator in the connection matrix after a determination that the individual weight is below the threshold.

23. The non-transitory machine readable medium of claim 20, wherein updating the value of the weight comprises:
inputting a training data set into the sparsely connected deep neural network;
determining a network loss based on the training data set and the weights corresponding to the available connections; and
updating the value of the weight based on the network loss.

24. The non-transitory machine readable medium of claim 20, wherein the sparsely connected deep neural network and the another sparsely connected deep neural network are generated in an iteration of an iterative compressing process, and the iterative compressing process comprises:
stochastically determining, for the iteration, an activation indicator indicating whether to compress the deep neural network in the iteration; and
generating the sparsely connected deep neural network and the another sparsely connected deep neural network when the activation indicator indicates to compress the deep neural network in the iteration.

25. The non-transitory machine readable medium of claim 24, wherein stochastically determining the activation indicator comprises applying a probability function based on an iteration number of the iteration, and the probability function is a monotonically non-increasing probability function.

* * * * *

UNITED STATES PATENT AND TRADEMARK OFFICE
CERTIFICATE OF CORRECTION

PATENT NO. : 12,093,813 B2
APPLICATION NO. : 16/328689
DATED : September 17, 2024
INVENTOR(S) : Anbang Yao et al.

It is certified that error appears in the above-identified patent and that said Letters Patent is hereby corrected as shown below:

In the Claims

In Column 35, Claim 7, Line 61, delete "when" and insert -- when the --, therefor.

Signed and Sealed this
Twenty-ninth Day of October, 2024

Katherine Kelly Vidal
*Director of the United States Patent and Trademark Office*